(12) United States Patent
Kagaya et al.

(10) Patent No.: US 11,184,545 B2
(45) Date of Patent: Nov. 23, 2021

(54) DISPLAY CONTROL APPARATUS, IMAGING APPARATUS, CONTROL METHOD FOR DISPLAY APPARATUS, AND NON-TRANSITORY COMPUTER READABLE MEDIUM

(71) Applicant: CANON KABUSHIKI KAISHA, Tokyo (JP)

(72) Inventors: Sosuke Kagaya, Tokyo (JP); Hirofumi Urabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 78 days.

(21) Appl. No.: 16/700,665

(22) Filed: Dec. 2, 2019

(65) Prior Publication Data

US 2020/0177818 A1  Jun. 4, 2020

(30) Foreign Application Priority Data

Dec. 4, 2018 (JP) .............................. JP2018-227505

(51) Int. Cl.
*H04N 5/232* (2006.01)

(52) U.S. Cl.
CPC ... *H04N 5/23296* (2013.01); *H04N 5/232127* (2018.08); *H04N 5/232935* (2018.08)

(58) Field of Classification Search
CPC .................. H04N 5/232127; H04N 5/232935
USPC ............................................. 348/333.05, 345
See application file for complete search history.

(56) References Cited

U.S. PATENT DOCUMENTS

| | | | |
|---|---|---|---|
| 6,753,917 B2 | 6/2004 | Tanizoe et al. | |
| 2008/0068487 A1* | 3/2008 | Morita | H04N 5/23219 348/333.05 |
| 2008/0278619 A1* | 11/2008 | Otsu | H04N 5/232123 348/349 |
| 2009/0153649 A1* | 6/2009 | Hirooka | H04N 5/23293 348/47 |
| 2010/0149402 A1* | 6/2010 | Aoki | H04N 5/23293 348/333.12 |
| 2011/0157385 A1* | 6/2011 | Hoshino | G03B 5/00 348/208.99 |

FOREIGN PATENT DOCUMENTS

| | | |
|---|---|---|
| JP | 2010-226496 A | 10/2010 |
| JP | 2018-006995 A | 1/2018 |

* cited by examiner

*Primary Examiner* — Anthony J Daniels
(74) *Attorney, Agent, or Firm* — Cowan, Liebowitz & Latman, P.C.

(57) ABSTRACT

A display control apparatus, includes: at least one processor and/or at least one circuit to perform the operations of the following units: an input unit configured to acquire an input image which is an image captured by an imaging apparatus; a generation unit configured to generate at least one zoom image which is an image generated by magnifying a part of the regions of the input image; an acquisition unit configured to acquire focus information of the imaging apparatus; and a determination unit configured to determine which one of (1) the input image, (2) the zoom image and (3) both of the input image and the zoom image are to be displayed as a display image on a display unit on the basis of the focus information.

12 Claims, 17 Drawing Sheets

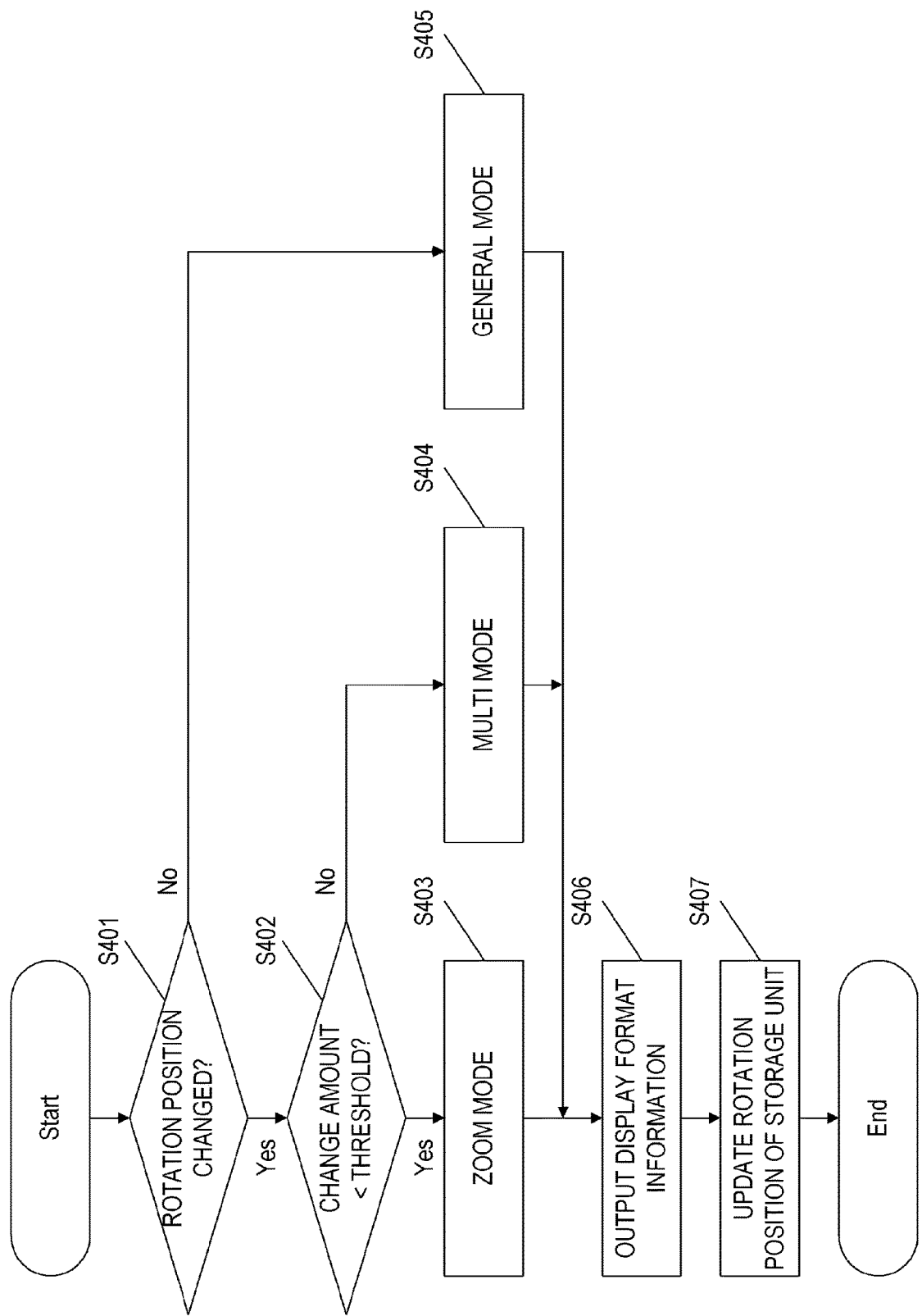

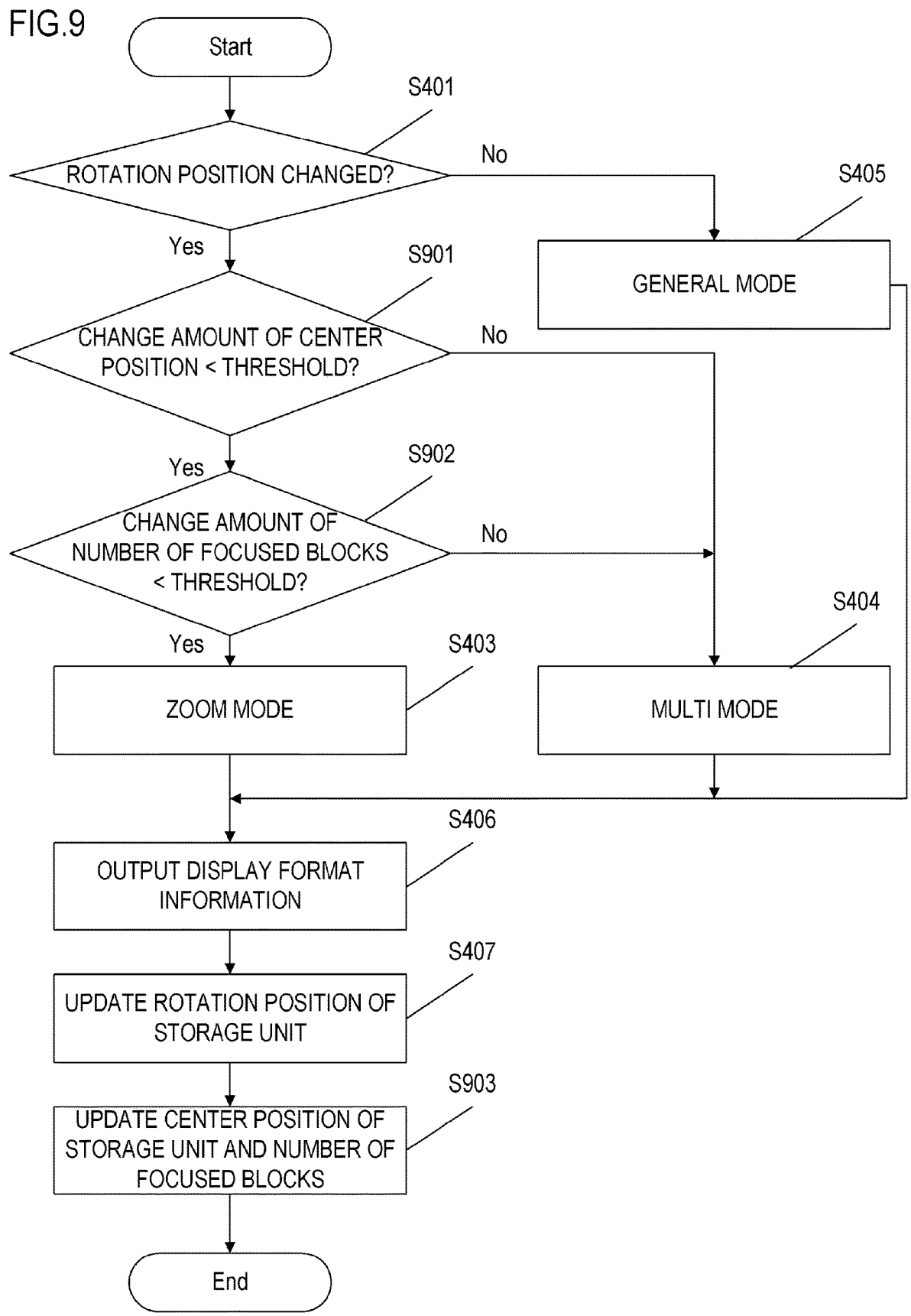

DISPLAY CONTROL APPARATUS, IMAGING APPARATUS, CONTROL METHOD FOR DISPLAY APPARATUS, AND NON-TRANSITORY COMPUTER READABLE MEDIUM

BACKGROUND OF THE INVENTION

Field of the Invention

The present invention is related to a display control apparatus, an imaging apparatus, a control method for a display apparatus, and a non-transitory computer readable medium.

Description of the Related Art

Lately the resolution of images is becoming progressively higher, and in order to express the realistic sensation of high resolution images (e.g. 4K, 8K images), accurate focusing on an object during image capturing is becoming very important.

In the case of performing a fine adjustment of high resolution images by manual focusing, focusing is performed by displaying a zoomed image using a zoom function of the image display apparatus, since it is difficult to visually adjust the focusing of the image in the state of displaying the entire input image. A currently available automatic zoom display function is a function to display a zoomed image of an object focused on an electronic view finder (EVF), which interlocks with the focus adjustment operation. However if the zoom screen is displayed during focusing, the entire image cannot be viewed. Therefore if the user wishes to check the entire image, such as in the case of checking the focusing degree or blurred degree of a region other than the region focused by the user, the user must switch between ON/OFF of the zoom display every time.

There is a prior art which allows to check a zoom image and the entire input image simultaneously. Japanese Patent Application Publication No. 2010-226496 discloses a technique to generate a sub-screen for the zoom image generated by zooming a focused region of an image, and display the zoom image in a position that does not overlap with the focused region in the input image.

However in the case of the technique disclosed in Japanese Patent Application Publication No. 2010-226496, the zoom image can be checked with the input image, but to perform fine adjustment of focus in the focused region, sufficient resolution cannot be provided in the small sub-screen. Hence depending on the purpose, setting must be switched to display only the zoom image, which is still challenging.

SUMMARY OF THE INVENTION

It is an object of the present invention to provide a technique to perform appropriate display switching in accordance with the adjustment of focusing.

The present invention in its first aspect provides a display control apparatus, comprising:
  at least one processor and/or at least one circuit to perform the operations of the following units:
  an input unit configured to acquire an input image which is an image captured by an imaging apparatus;
  a generation unit configured to generate at least one zoom image which is an image generated by magnifying a part of the regions of the input image;
  an acquisition unit configured to acquire focus information of the imaging apparatus; and
  a determination unit configured to determine which one of (1) the input image, (2) the zoom image and (3) both of the input image and the zoom image are to be displayed as a display image on a display unit on the basis of the focus information.

The present invention in its second aspect provides an image apparatus, comprising:
  an optical system;
  an imaging unit configured to capture an object image formed by the optical system; and
  the above display control apparatus.

The present invention in its third aspect provides a control method for a display apparatus, the control method comprising:
  acquiring an input image which is an image captured by an imaging apparatus;
  generating at least one zoom image which is an image generated by magnifying a part of the regions of the input image;
  acquiring focus information of the imaging apparatus; and
  determining which one of (1) the input image, (2) the zoom image and (3) both of the input image and the zoom image are to be displayed as a display image on a display unit on the basis of the focus information.

The present invention in its fourth aspect provides a non-transitory computer readable medium that stores a program, wherein the program causes a computer to execute a control method for a display apparatus, the control method comprising:
  acquiring an input image which is an image captured by an imaging apparatus;
  generating at least one zoom image which is an image generated by magnifying a part of the regions of the input image;
  acquiring focus information of the imaging apparatus; and
  determining which one of (1) the input image, (2) the zoom image and (3) both of the input image and the zoom image are to be displayed as a display image on a display unit on the basis of the focus information.

Further features of the present invention will become apparent from the following description of exemplary embodiments with reference to the attached drawings.

BRIEF DESCRIPTION OF THE DRAWINGS

FIG. 4 is a flow chart depicting an example of display format determination processing according to the first embodiment;

FIG. 9 is a flow chart depicting an example of display format determination processing according to a second embodiment;

DESCRIPTION OF THE EMBODIMENTS

First Embodiment

<Overview>

FIRST EMBODIMENT

<Overview>

A display apparatus according to a first embodiment will be described. The display apparatus according to the first embodiment is a display apparatus to perform live view display (LV display) of an image (including a moving image) captured by an imaging apparatus (Camera). When focusing is performed in a manual focus mode, the display apparatus according to the first embodiment switches the display of the captured image to a zoom image or an input image+zoom image, depending on the focus information of the imaging apparatus. The display apparatus according to the first embodiment will be described in the sequence of general configuration and processing content.

<General Configuration>

Figure 1:
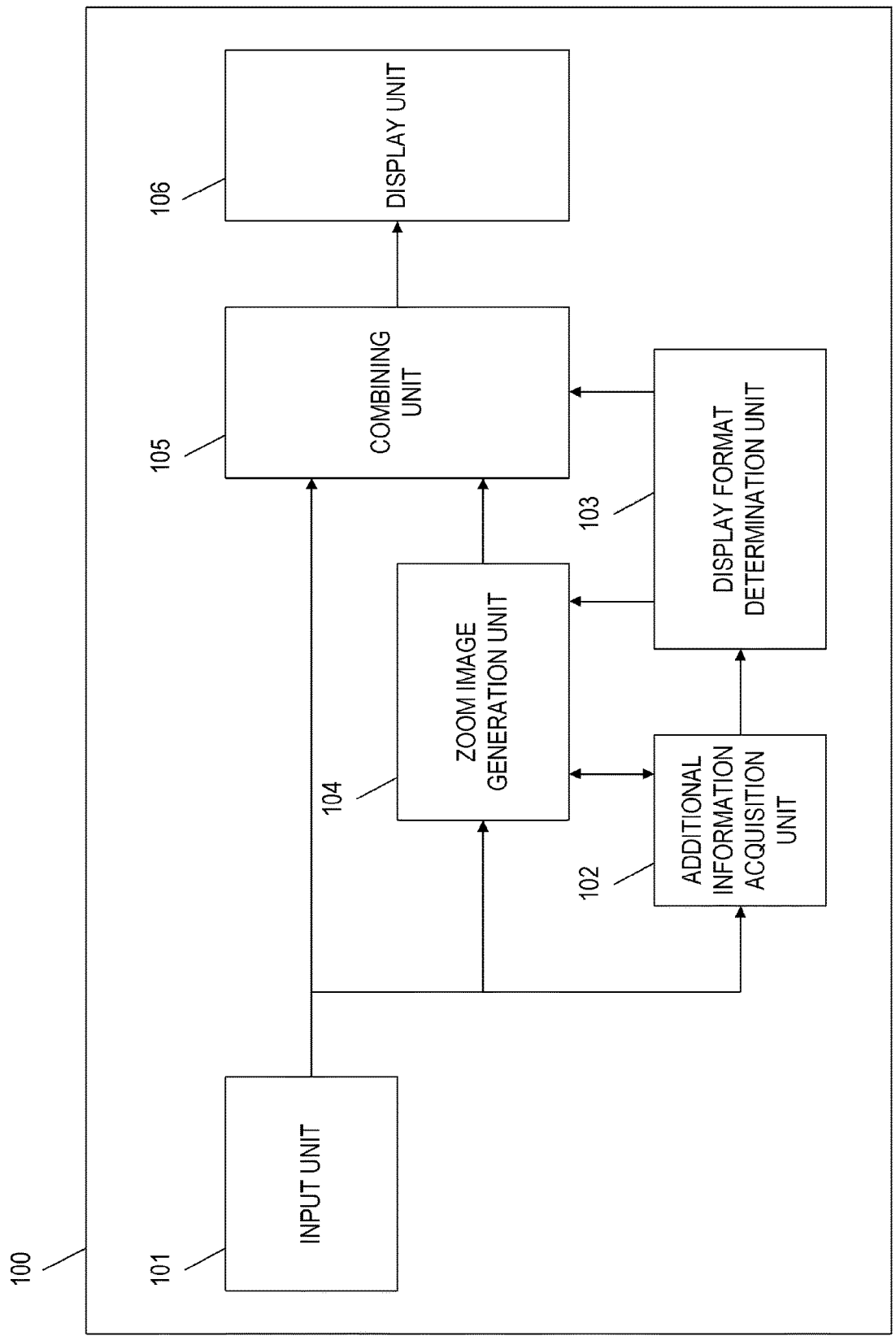
FIG. 1 is a functional block diagram depicting a display apparatus according to a first embodiment.

FIG. 1 is a functional block diagram of the display apparatus 100 according to the first embodiment. The display apparatus 100 is an information processing apparatus (computer) which includes an arithmetic unit (processor), memory, storage device and input/output device. The later mentioned functions of the display apparatus 100 are provided by the display apparatus 100 executing the programs stored in the storage device. A part or all of the functions may be implemented by such a dedicated logic circuit as an ASIC and FPGA.

An input unit 101 is a functional unit that acquires image data (input image, image signals) from an imaging apparatus (not illustrated), which is connected with the display apparatus 100 via cable. In the first embodiment, a live view image (LV image) is acquired as an input image, but the acquisition target is not limited to an LV image. For example, if the display apparatus 100 includes a serial digital interface (SDI) input terminal conforming to SDI standards, the input unit 101 acquires an SDI signal conforming to the standards. The input unit 101 outputs the acquired image data to an additional information acquisition unit 102, a combining unit 105 and a zoom image generation unit 104, which will be described later. The display apparatus 100 may acquire an image from the imaging apparatus via wireless communication without using cable.

The additional information acquisition unit 102 is a functional unit that acquires additional information added to the image signal. In the first embodiment, the additional information includes rotation position information of a focus ring and focused region information, which will be described later. The additional information acquisition unit 102 outputs the acquired rotation position information of the focus ring to a display format determination unit 103, which will be described later. Further, the additional information acquisition unit 102 outputs the acquired focused region information to the zoom image generation unit 104, which will be described later.

The rotation position information is information (focus information) to indicate the rotation position of the focus ring. Here the focus ring is a ring that is installed in a lens unit (optical system), which is attached to the imaging apparatus, and which the user rotates to adjust focal distance.

Figure 2:
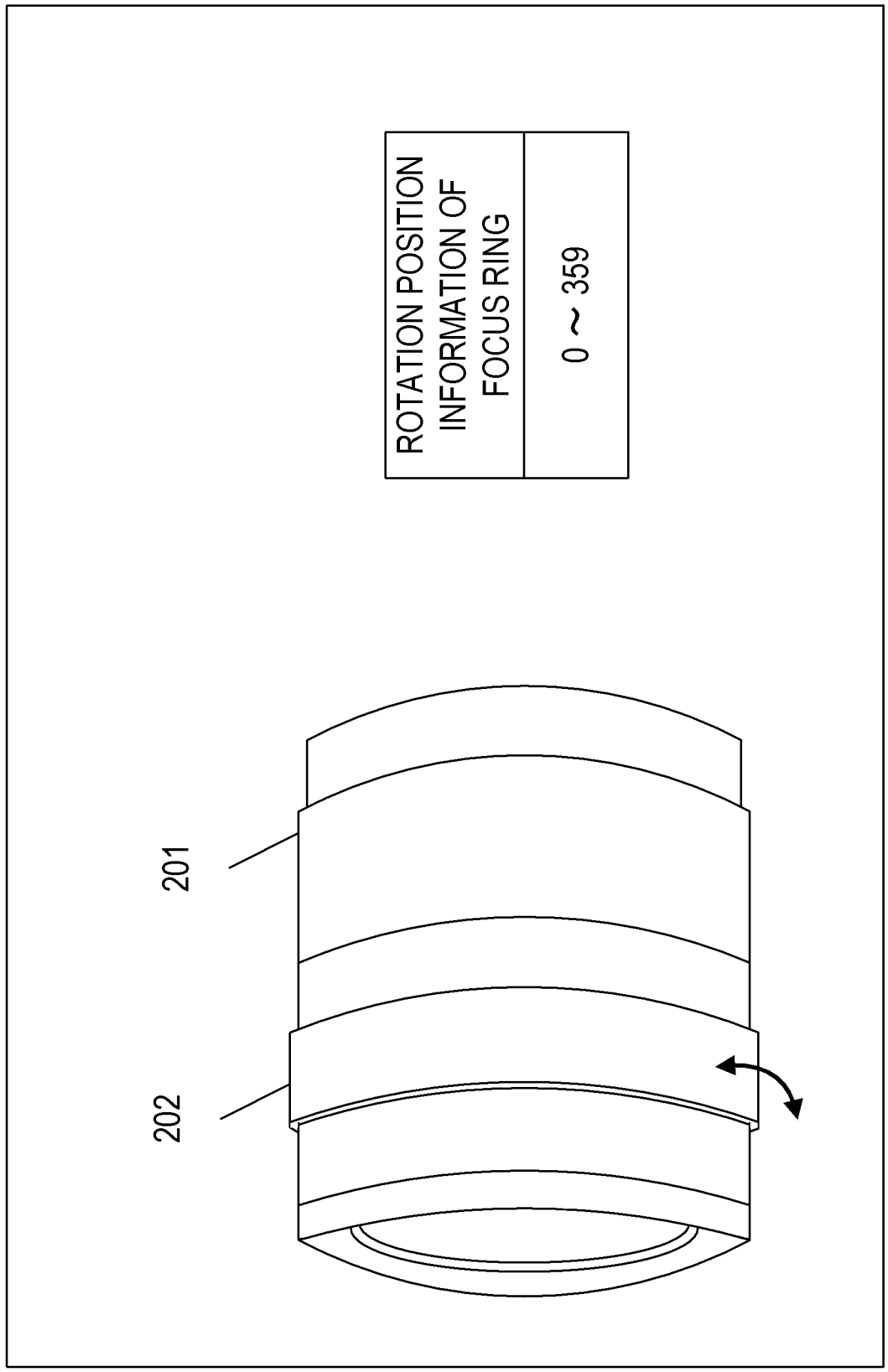
FIG. 2 is a diagram depicting an example of a lens according to the first embodiment.

FIG. 2 indicates a lens unit 201 and a focus ring 202 used for an imaging apparatus. The user adjusts focus (focal distance) by rotating the focus ring 202. The rotation position information of the focus ring is information to indicate the current rotation position of the focus ring 202 with respect to the reference rotation position. In the first embodiment, the movable range of the focus ring is assumed to be 360° from the reference rotation position. The rotation position information is indicated by a numeric value (0 to 359) representing the rotation angle from the reference rotation position. The additional information acquisition unit 102 may acquire the focal distance of the optical system as the focus information.

The focused region information is information to indicate a focused location (focused region) in the input image. Here "focused" refers to a state where the object distance is within the range of the depth of field. In the first embodiment, the focused region information is represented by data which indicates the focusing rate of each block formed by dividing the input image into a plurality of blocks (sub-regions). The focusing rate is a ratio of focused pixels with respect to the pixels included in each block (see Expression 1). Here the focused pixel refers to a pixel that is focused among the pixels in the block. Whether a pixel is focused or not can be determined using a known method, such as a method of determining whether the object distance is within the depth of field, or a method of determining whether contrast is large or not, as mentioned above.

$$\text{Focusing rate} = (\text{number of focused pixels in block} / \text{total number of pixels in block}) \times 100 \quad (1)$$

Figure 3A:
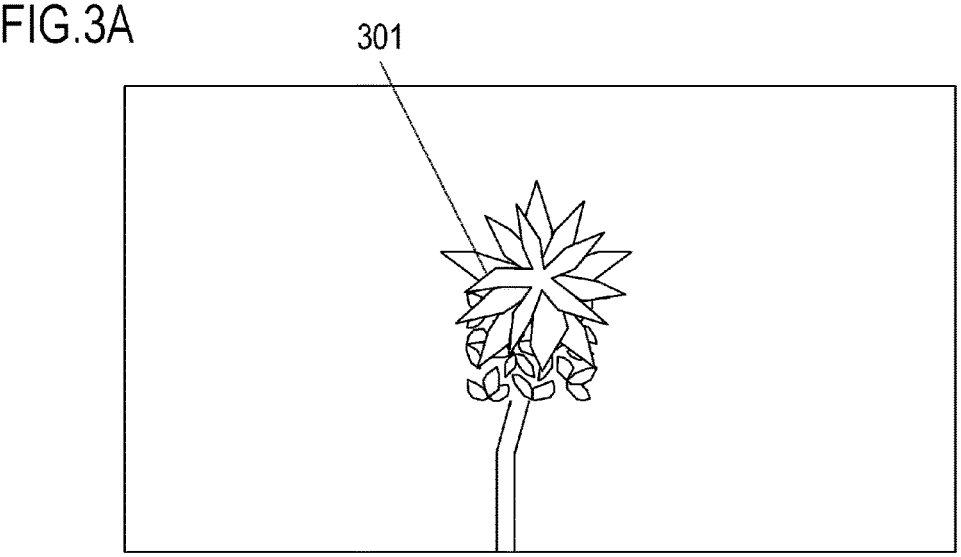
FIG. 3A to FIG. 3C are diagrams depicting an example of a focused region according to the first embodiment.
Figure 3B:
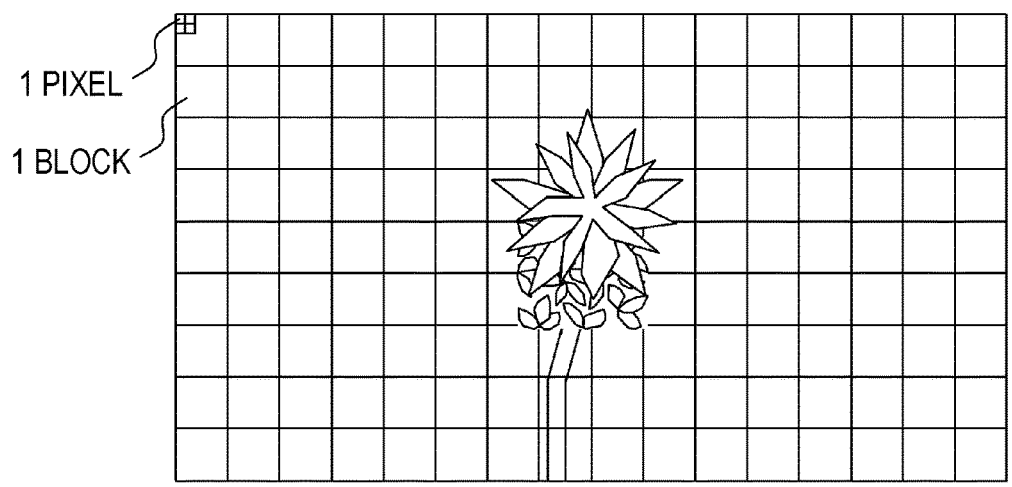
Figure 3C:
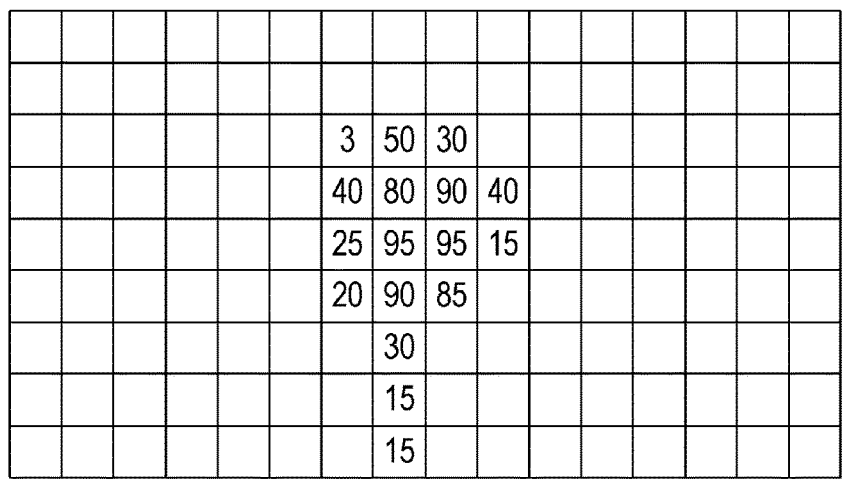

FIG. 3A to FIG. 3C are diagrams depicting an input image and focused region information. FIG. 3A is an example of an input image. The input image in FIG. 3A is an image acquired by capturing an object 301 at the center and other objects does not exist in the input image. FIG. 3B is a diagram which indicates the input image and blocks to divide the input image into a plurality of sub-regions. In the first embodiment, an example of dividing the input image into 16 in the horizontal direction, and 9 in the vertical direction will be described. FIG. 3C indicates the focusing rate of each block. In FIG. 3C, the center of the input image, out of the object 301, is focused. Therefore the focusing rate of a block which includes many focused pixels is high, and the focusing rate of a block which includes a small number of focused pixels or includes no focused pixels is low.

The display format determination unit 103 is a functional unit that determines the display mode (display format) based on the rotation position information. In concrete terms, the display format determination unit 103 determines the display format in accordance with the change amount of the rotation position information. The processing to determine the display format will be described in detail later. The display format determination unit 103 outputs the determined display format to the zoom image generation unit 104 and the combining unit 105 (described later) as the display format information.

The display format information is information to indicate the display mode which displays images on a display unit 106 (displayed later). The display mode includes: "General mode", "Zoom mode" and "Multi mode". General mode is a mode to display only the input image on the display unit 106. "Zoom mode" is a mode to display only the zoom image on the display unit 106. "Multi-mode" is a mode to display both the input image and the zoom image on the display unit 106.

The zoom image generation unit 104 is a functional unit that generates a zoom image based on the focused region information and display format information. The zoom image is an image generated by magnifying a part of the region of the input image. The zoom image generation unit 104 generates a zoom image so as to include the focused region. The zoom image generation unit 104 outputs the generated zoom image to the combining unit 105. The processing to generate a zoom image will be described in detail later.

The combining unit 105 is a functional unit that generates an image to be displayed on the display unit 106. In the first embodiment, the combining unit 105 generates an image (combined image) based on the input image, the zoom image and the display format information. The combining unit 105 outputs the generated combined image to the display unit 106.

The display unit 106 is a liquid crystal panel (display) that displays a combined image to be outputted from the combining unit 105. The configuration of the display unit 106 is not especially limited, and an OLED panel, for example, may be used instead of a liquid crystal panel.

<Processing Content>
<<Display Format Determination Processing>>

FIG. 4 is a flow chart depicting processing (display format determination processing) to determine a display mode (display format) in the display format determination unit 103. In the first embodiment, the display format determination unit 103 starts this processing when the additional information acquisition unit 102 inputs the instruction to start processing to determine the display format and the rotation position information. In the first embodiment, this processing is executed for each predetermined frame. The additional information acquisition unit 102 may start this processing even if the addition information does not include the rotation position information. In this case, for the rotation position information, the display format determination unit 103 may use the reference rotation position as the rotation position.

In step S401, the display format determination unit 103 determines whether the rotation position changed or not, based on a previous rotation position which is held in the storage unit (not illustrated) and a current rotation position which is included in the rotation position information. Processing advances to step S402 if the rotation position changed, or to step S405 if not. In the first embodiment, the display format determination unit 103 determines that the rotation position changed if the difference between the previous rotation position information and the current rotation position information is not 0. The display format determination unit 103 may determine that the rotation position changed if this difference is at least a predetermined value Th1. The predetermined value Th1 is a value to determine whether the difference of the rotation position information is due to an error caused by an operation error. In the first processing, the previous rotation position is not available, hence processing may advance to step S405, just like the case of the difference being 0, or the reference rotation position may be used as the previous rotation position. The storage unit may be any one of the storage units included in the display apparatus 100, an imaging apparatus, and an external apparatus.

In step S402, the display format determination unit 103 determines whether the change amount between the previous rotation position information and the current rotation position information is less than a predetermined threshold Th2 (Th2>Th1). Processing advances to step S403 if the change amount is less than the predetermined threshold Th2, or to step S404 if not.

In the first embodiment, the change amount of the rotation position is an absolute value of the difference between the previous rotation position and the current rotation position (that is, the difference of the rotation position that was generated within a predetermined time). The method of calculating the change amount is not especially limited, and may be a difference between a predetermined position (e.g. reference rotation position) and the current rotation position, or may be a total of the moving amount of the rotation position within a predetermined time, for example.

Here the predetermined threshold Th2 is a value to determine whether the movement of the focus ring by the user is for fine adjustment for rough adjustment. For example, the display format determination unit 103 determines whether the movement of the focus ring is for fine adjustment or rough adjustment, depending on whether the change amount of the rotation position per 100 [ms] is less than 5 or not. In the case where the display apparatus is operating at 60 Hz and the focus rotation position information can be acquired in 10 frame units, the threshold Th2 of the moving amount of the rotation position within the previous predetermined time (10×(1/60)×1000 [ms]) before acquiring the latest input image, is 8.33 (see Expression 2).

$$Th2 = 10 \times (1/60) \times 1000 \times (5/100) \approx 8.33 \quad (2)$$

In step S403 to step S405, the display format determination unit 103 determines the display format. If the change amount of the rotation information is less than the predetermined threshold Th2 (Yes in S402), the display format determination unit 103 determines the "Zoom mode" as the display format (S403). If the change amount of the rotation information is not less than the predetermined threshold Th2 (No in S402), the display format determination unit 103 determines the "Multi mode" as the display format (S404). Further, if the rotation information is not changed (No in S401), then the display format determination unit 103 determines the "General mode" as the display format (S405).

In step S406, the display format determination unit 103 outputs the display format information to the zoom image generation unit 104 and the combining unit 105.

In step S407, the display format determination unit 103 updates the rotation position held in the storage unit to the current rotation position.

By the processing in FIG. 4, control is performed so that the zoom image is displayed alone (Zoom mode) if the user performs fine adjustment of the focus, and the input image and the zoom image are both displayed (Multi mode) if the user performs rough adjustment of the focus.

<<Zoom Image Generation Processing>>

Figure 5:
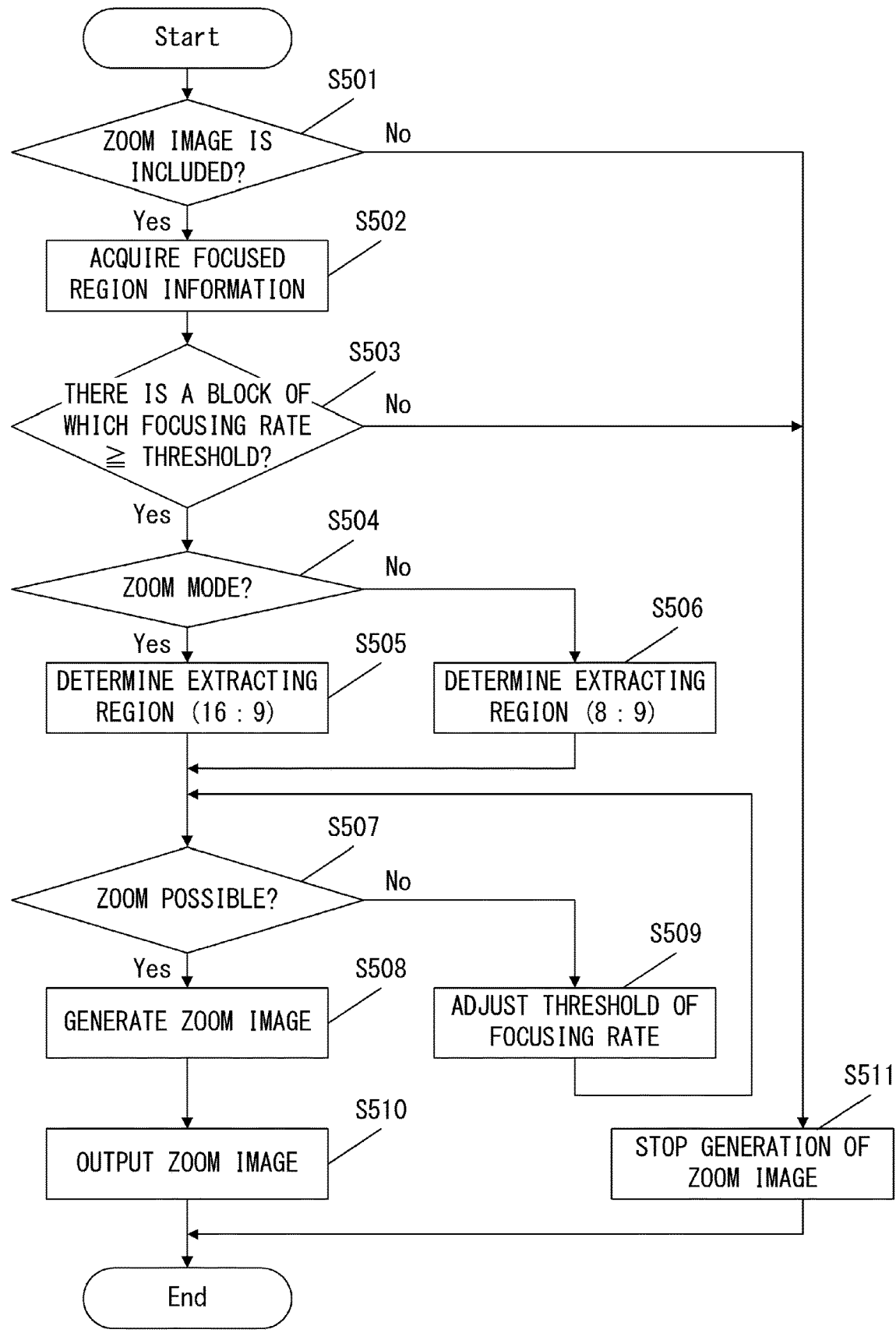
FIG. 5 is a flow chart depicting zoom image generation processing according to the first embodiment.

FIG. 5 is a flow chart depicting processing to generate a zoom image (zoom image generation processing) in the zoom image generation unit 104. In the first embodiment, this processing is started when the zoom image generation unit 104 inputs the display format (display mode) from the display format determination unit 103.

In step S501, the zoom image generation unit 104 determines whether the display mode is a mode to display an image including a zoom image. In the first embodiment, a mode to display an image including a zoom image is either the "Zoom mode" or the "Multi mode". A mode in which an image including a zoom image is not displayed is "General mode". Processing advances to step S502 if the display mode is a mode to display an image including a zoom image, or to step S511 if not.

In step S502, the zoom image generation unit 104 acquires the focused region information which is outputted from the additional information acquisition unit 102.

In step S503, the zoom image generation unit 104 determines whether there is a block of which focusing rate is at least a predetermined threshold Th3. Processing advances to step S504 if there is a block of which focusing rate is at least the predetermined threshold Th3, or to step S511 if not. The predetermined threshold Th3 is a value that is used to determine whether a region to be zoomed (target) exists. Therefore if there is no focused region (region to be zoom) (in the case where the focusing rate is less than Th3 in all the blocks), a zoom image is not generated or displayed even if the user operated the focus ring. In the first embodiment, a case where the predetermined threshold Th3 is 40 will be described.

In step S504, the zoom image generation unit 104 determines whether the display mode is the "Zoom mode". In the first embodiment, the case where the display mode is not the "Zoom mode" is the case where the display mode is the "Multi mode". Processing advances to step S505 if the display mode is the "Zoom mode", or to step S506 if not.

In step S505, the zoom image generation unit 104 determines a region to be extracted as a zoom image for the "Zoom mode" from the input image. If the display mode is the "Zoom mode" (Yes in S504), the display apparatus 100 displays the zoom image on the entire screen of the display unit 106.

In the first embodiment, an example when the resolution of the input image data and the screen resolution of the display unit 106 is 3840×2160 will be described. In this case, in order to display a zoom image on the entire screen (3840×2160 display region), the zoom image generation unit 104 determines a region which includes a block having a focusing rate higher than the predetermined threshold Th3, and of which aspect ratio is 16:9, as the extraction region.

Figure 6A:
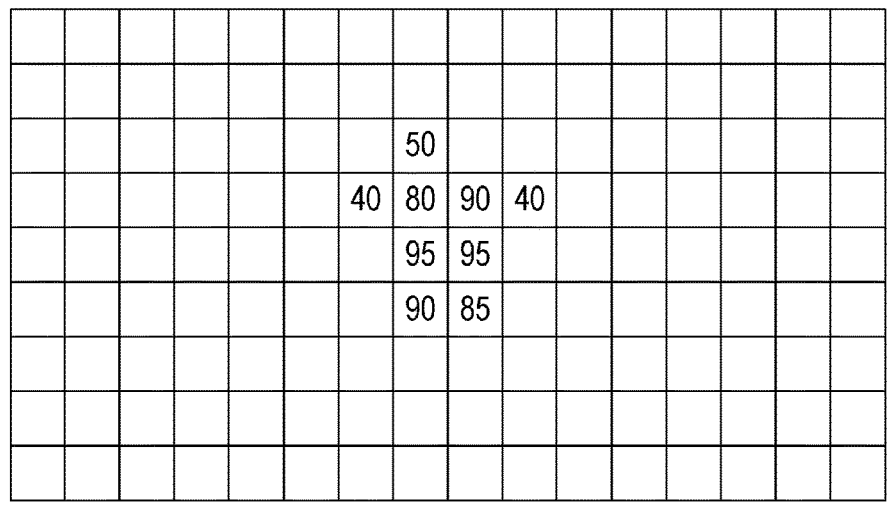
FIG. 6A to FIG. 6C are diagrams depicting an example of an extraction region according to the first embodiment.
Figure 6B:
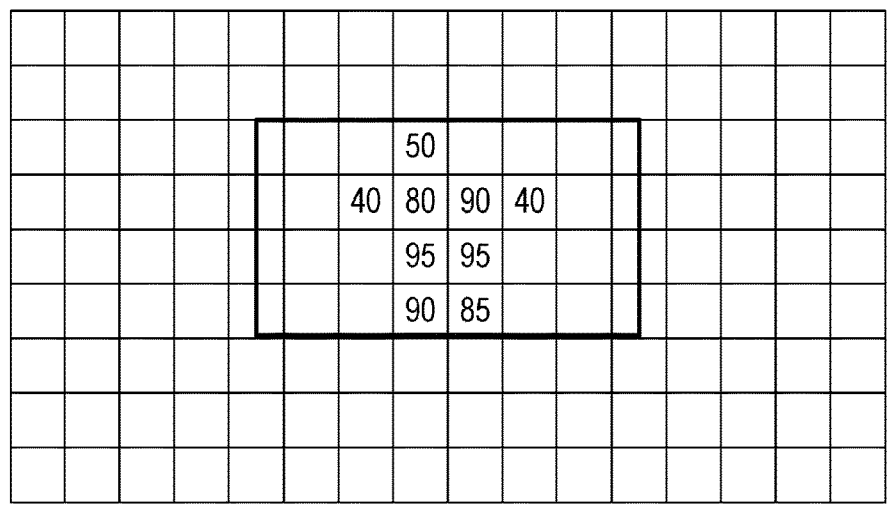
Figure 6C:
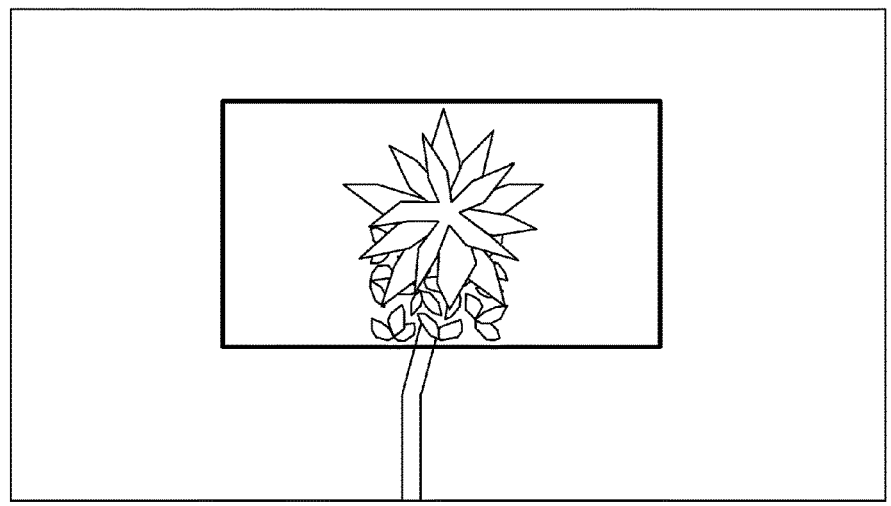

FIG. 6A to FIG. 6C are diagrams depicting an example of processing to generate a zoom image for the "Zoom mode" according to the first embodiment. FIG. 6A indicates an example of a focusing rate of each block in the input image illustrated in FIG. 3A. In the first embodiment, the zoom image generation unit 104 regards only the blocks of which focusing rate is at least 40 (predetermined value Th3) as the extraction region, as illustrated in FIG. 6A. FIG. 6B indicates the extraction region. As illustrated in FIG. 6B, the zoom image generation unit 104 determines a region (aspect ratio 16:9) where the block having the highest focusing rate, among the blocks of which focusing rates are at least 40, is disposed at the center, as the extraction region. The method of determining the extraction region is not especially limited, and the only requirement is that the extraction region includes at least one block of which focusing rate is at least the predetermined threshold Th3. FIG. 6C indicates a region extracted as the zoom image from the input image.

In step S506, the zoom image generation unit 104 determines a region to be extracted as a zoom image for the "Multi mode" from the input image. If the display mode is the "Multi mode" (No in S504), the display apparatus 100 displays the zoom image on a part of the regions of the display unit 106.

In the first embodiment, an example of the zoom image generation unit 104 displaying the zoom image in the right half region (e.g. 1920×2160 display region) on the screen of the display unit 106 will be described. In this case, in order to display the zoom image in this right half region, the zoom image generation unit 104 determines a region which includes a block having a focusing rate higher than the predetermined threshold Th3, and of which aspect ratio is 8:9, as the extraction region. The input image is reduced and displayed in the left half region (e.g. 1920×1080 display region) on the screen of the display unit 106.

Figure 7A:
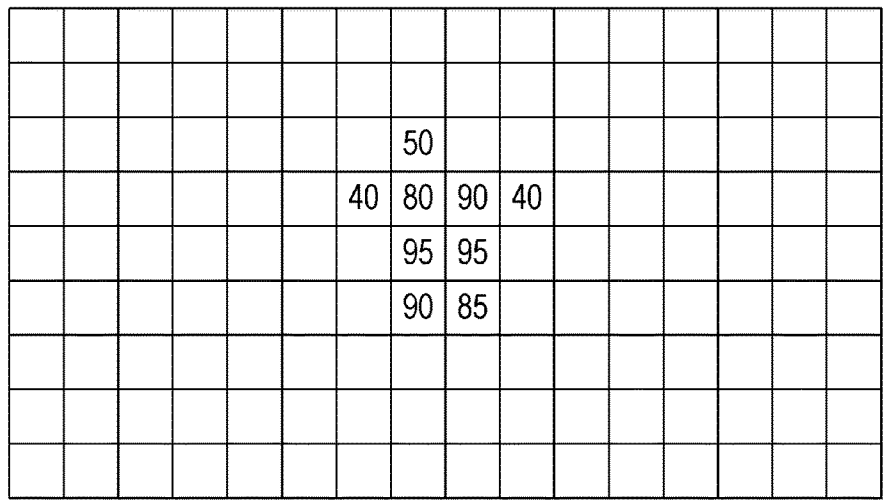
FIG. 7A to FIG. 7C are diagrams depicting an example of an extraction region according to the first embodiment.
Figure 7B:
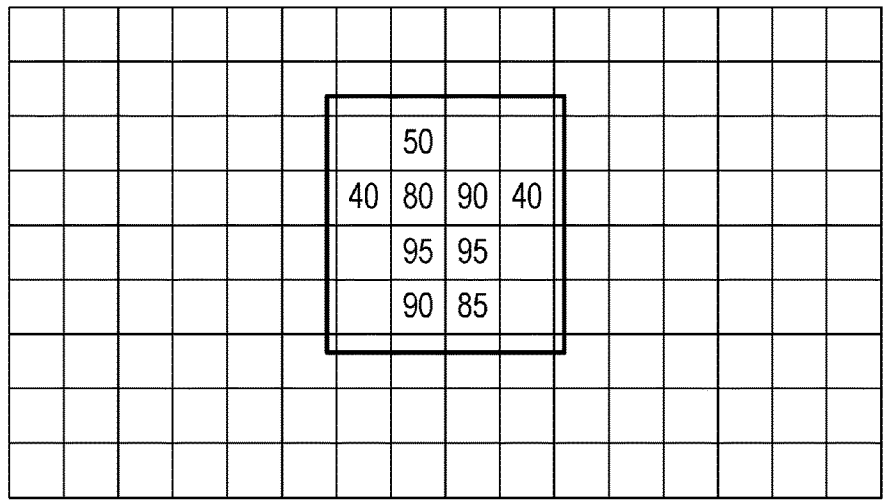
Figure 7C:
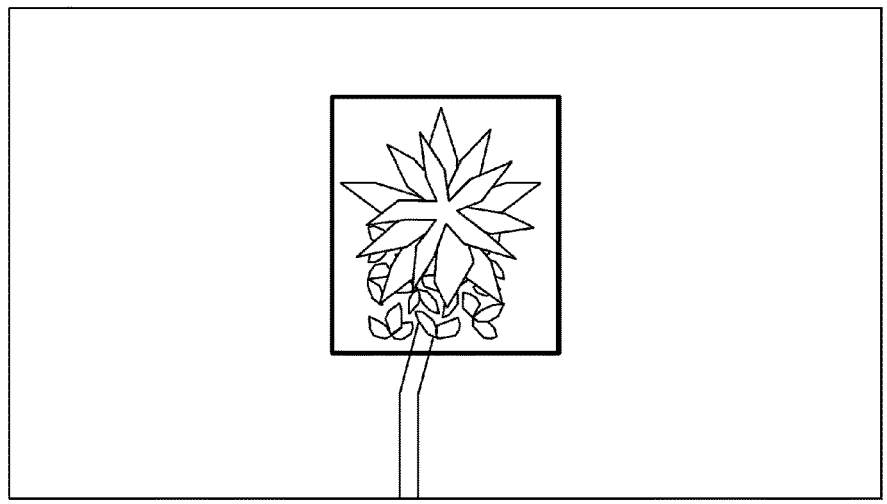

FIG. 7A to FIG. 7C are diagrams depicting an example of processing to generate a zoom image for the "Multi mode" according to the first embodiment. FIG. 7A indicates an example of a focusing rate of each block in the input image illustrated in FIG. 3A, just like the case of FIG. 6A. FIG. 7B indicates an extraction region. As illustrated in FIG. 7B, the zoom image generation unit 104 determines a region (aspect ratio 8:9) where the block having the highest focusing rate, among the blocks of which focusing rates are at least 40, is disposed at the center, as the extraction region. The method of determining the extraction region is not especially limited, and the only requirement is that the extraction region includes at least one block of which focusing rate is at least the predetermined threshold Th3. FIG. 7C indicates a region extracted as the zoom image from the input image.

In step S507, the zoom image generation unit 104 determines whether the magnification ratio of the zoom image is at least a predetermined value Th4. The magnification ratio is a ratio of the size of the region where the zoom image is displayed, with respect to the size of the extraction region. Processing advances to step S508 if the magnification ratio is at least the predetermined value Th4, or to step S509 if not.

In the case where there are many blocks of which focusing rates are at least the threshold Th3, the extraction region is large, which decreases the magnification ratio. Therefore the predetermined threshold Th4 is used as the index value of the magnification ratio to determine whether the extraction region is zoom-displayed or not. Then the size of the extraction region is limited by adjusting the above mentioned predetermined threshold Th3 of the focusing rate. The processing to adjust the predetermined threshold Th3 (step S509) will be described later. For example, the predetermined threshold Th4 is preferably 1.5. In this case, if the display region of the zoom image is 3840×2160, the zoom processing is not executed unless the extraction region is 2560×1440 or less. In the same manner, if the display region of the zoom image is 1920×2160, the zoom processing is not executed unless the extraction region is 1280×1440 or less.

In step S508, the zoom image generation unit 104 generates a zoom image generated by magnifying the image in the extraction region so as to match the size of each display region. In the first embodiment, the size of the display region is 3840×2160 in the case of the "Zoom mode", and is 1920×2160 in the case of the "Multi mode".

In step S509, the zoom image generation unit 104 adjusts the predetermined threshold Th3 of the focusing rate. The predetermined threshold TH3 is adjusted to limit the size of the extraction region when the magnification ratio is the predetermined threshold Th4 or less (No in S507). Using the adjusted predetermined threshold Th3, the processing in step S507 is executed again.

In the first embodiment, the zoom image generation unit 104 increases the predetermined threshold Th3 of the current focusing ratio by 5 points at a time. In other words, in the first adjustment processing (S509), the predetermined threshold Th3 is adjusted to 45. In the second adjustment processing, the predetermined threshold Th3 is adjusted to 50. By increasing the threshold of the focusing rate like this, a region having a higher focusing rate is selected as the extraction target, and the size of the extraction region is limited. In the case where the target blocks no longer exist because of increasing the threshold of the focusing rate, the zoom image generation unit 104 may acquire a region having the upper limit size around a block, of which focusing rate is highest in the previous extraction region, as the extraction region, for example.

In step S510, the zoom image generation unit 104 outputs the zoom image generated in step S509 to the combining unit 105.

In step S511, the zoom image generation unit 104 ends this processing without performing the zoom image generation processing.

By the processing in FIG. 5, the zoom image in which a region having a high focusing rate is magnified, is generated in the entire input image in the Zoom mode or the Multi mode.

<Image Display Example>

Figure 8A:
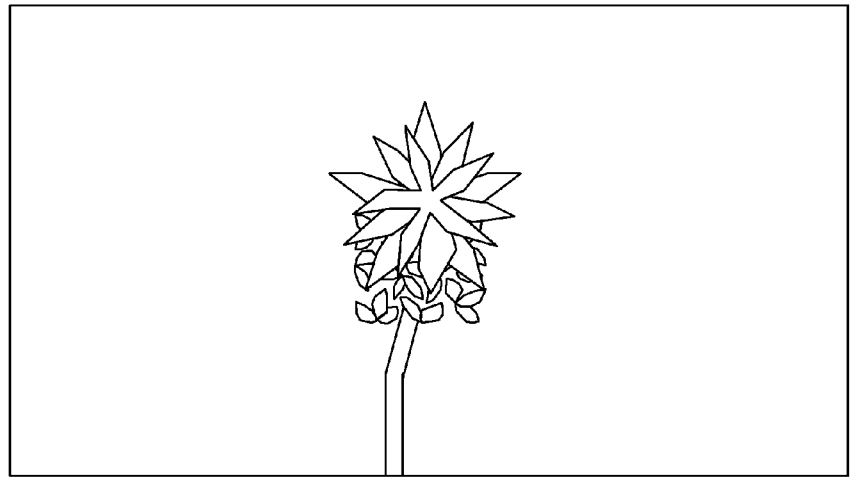
FIG. 8A to FIG. 8C are diagrams depicting an example of the image display according to the first embodiment.
Figure 8B:
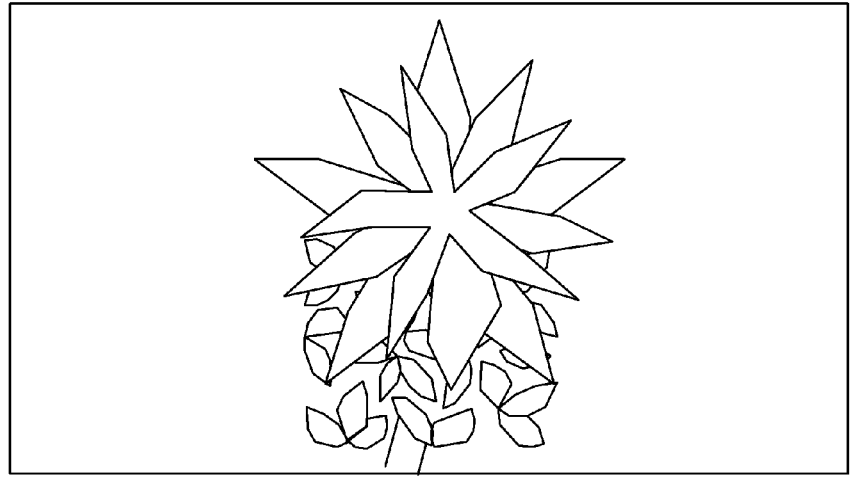
Figure 8C:
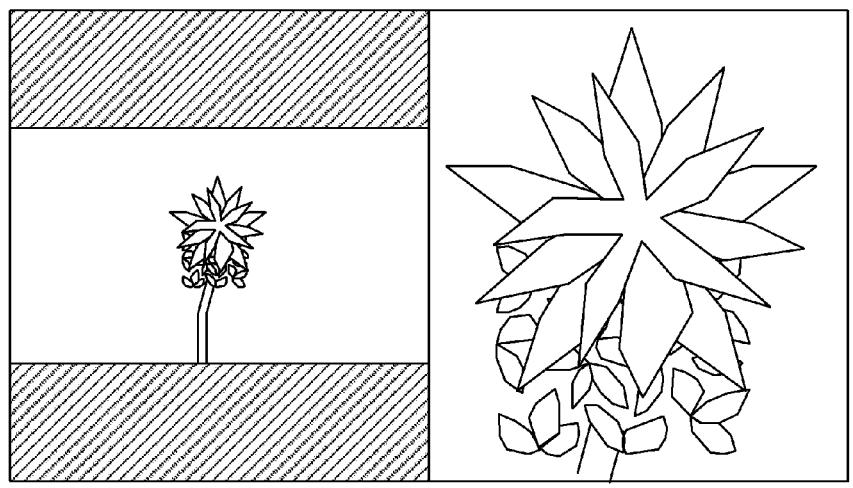

FIG. 8A to FIG. 8C are diagrams depicting a display example in each display mode of the first embodiment. FIG. 8A is an example when the entire input image (the same as FIG. 3A) is displayed in the "General mode". FIG. 8B is an example when the entire zoom image is displayed in the "Zoom mode". In FIG. 8B, the zoom image, generated by magnifying the extraction region enclosed by the solid line in FIG. 6C in the processing in step S505, is displayed. FIG. 8C is an example when both the input image and the zoom image are displayed in the "Multi mode". On the left side of the display screen, the image, generated by reducing the input image in FIG. 3A, is displayed. On the right side of the display screen, the zoom image, generated by magnifying the extraction region enclosed by the solid line in FIG. 7C in the processing in step S506, is displayed.

<Advantageous Effect of the First Embodiment>

As described above, the display apparatus 100 according to the first embodiment determines the display format (display mode) of the image based on the change amount of the rotation position of the focus ring. If the change amount is small, the display apparatus 100 controls so that the zoom image alone is displayed on the entire screen. If the change amount is large, the display apparatus 100 controls so that the input image and the zoom image are displayed on the screen side-by-side. Thereby the user can closely check only the zoom image when the user performs fine adjustment of the focus. In the case where the user performs rough adjustment of the focus, the user can check the entire image as well while checking the zoom image.

(Modification of the First Embodiment)

In the first embodiment, an example of determining the display format based on the change amount of the rotation position (focal distance) of the focus ring, which is installed on the lens of the imaging apparatus, was described, but the display format may be determined in accordance with the aperture of the lens (depth of field). In this case, when the aperture changes, the display apparatus determines the display mode to be "Zoom mode" or "Multi mode" in accordance with the change amount of the aperture. For example, in the case where the aperture changes considerably, the display apparatus displays the zoom image and the input image in the "Multi mode". By this, the user can adjust the aperture while viewing the zoom image of this particular object, and can also check the general balance using the input image.

In the first embodiment described above, the focusing rate is calculated in block units, based on the focused region information, but the method of calculating the focused region is not limited to this. For example, a focused region may be determined in pixel units.

In the first embodiment, an example, when the extraction region is a region centering around a block having the highest focusing rate, was described, but the extraction region may be a region which includes a block of which focusing rate is at least the predetermined threshold Th3. Further, the extraction region may be a region which includes at least one block of which focusing rate is at least the predetermined threshold Th3.

Second Embodiment

<Overview>

In the first embodiment described above, the display mode is determined based on the change amount of the rotation position of the focus ring, but in a second embodiment, an example of determining the display mode based on the change amount of the position or size of the focused region will be described. An example of the case where the position of the focused region changes is a case where the focus is switched among a plurality of objects of which depths are mutually different. An example of the case where the size of the focused region changes is a case where a moving object is being tracked and focused. In the following, a functional unit having a similar function to the first embodiment is denoted with the same number, for which description is omitted.

<General Configuration>

A display apparatus 100 according to the second embodiment has a configuration similar to the display apparatus 100 of the first embodiment, but the functions of the additional information acquisition unit 102 and the display format determination unit 103 are different.

The additional information acquisition unit 102 is a functional unit that acquires additional information added to the image signal. In the second embodiment, the additional information includes rotation position information of a focus ring and focused region information. In the second embodiment, the additional information acquisition unit 102 outputs the acquired rotation position information and the focused region information to the display format determination unit 103, which will be described later. Further, just like the first embodiment described above, the additional information acquisition unit 102 outputs the acquired focused region information to the zoom image generation unit 104.

The display format determination unit 103 is a functional unit that determines the display mode (display format) based on the rotation position information and the focused region information. In concrete terms, the display format determination unit 103 determines the display format in accordance with the change amount of the position or the size of the focused region. The processing to determine the display format will be described later. The display format determination unit 103 outputs the determined display format to the zoom image generation unit 104 and the combining unit 105.

<Processing Method>

<<Display Format Determination Processing>>

FIG. 9 is a flow chart depicting a processing flow of the display format determination unit 103. Description on the processing in step S401, which is the same as the first embodiment, is omitted.

In step S901, the display format determination unit 103 determines whether the change amount of the position of the focused region is less than a predetermined threshold Th5, based on the focused region information. Processing advances to step S902 if the change amount is less than the predetermined threshold Th5, or to step S404 if not. In the second embodiment, this position is a center position of a region which includes a block of which focusing rate is at least 40.

In the second embodiment, the change amount of the center position is an absolute value of the difference between the previous center position and the current center position (that is, the difference between the center positions within a predetermined time). The method of calculating the change amount is not especially limited, and may be a difference between a predetermined position (e.g. reference rotation position) and the current center position, or may be a total of the moving amount of the center position within a predetermined time, for example. The position of the focused region may not be the center position, but a block of which focusing rate is the highest may be used as the position of the focused region, for example.

Here the predetermined threshold Th5 is a value to determine whether the focus of the imaging apparatus switched to a different object. For example, the display format determination unit 103 performs this determination depending on whether the change amount of the center position (coordinate values) per 100 [ms] is less than 100 pixels or not. In the case where the display apparatus is operating at 60 Hz and the focused region information can be acquired in 10 frame units, the threshold Th5 of the moving amount of the center position within the predetermined time ($10 \times (1/60) \times 1000$ [ms]) before acquiring the latest input image, is 167 pixels (see Expression 3).

$$Th5 = 10 \times (1/60) \times 1000 \times (5/100) \approx 167 \quad (3)$$

In step S902, the display format determination unit 103 determines whether the change amount of the size of the focused region is less than a predetermined threshold Th6, based on the focused region information. Processing advances to step S403 if the change amount is less than the predetermined threshold Th6, or to step S404 if not. In the second embodiment, this size is a number of blocks of which focusing rate is at least 40.

In the second embodiment, the change amount of the size is an absolute value of the difference between the previous size and the current size (that is, the difference of the sizes within a predetermined time). The method of calculating the change amount is not especially limited, and may be a difference between a predetermined size (e.g. reference size) and the current size, or may be a total of the change amount of the size within a predetermined time, for example. The size of the focused region is not limited to this, but may be a surface area of the focused region (total value of a number of focused pixels).

Here the predetermined threshold Th6 is a value to determine whether the position of the focused object (e.g. depth) has greatly changed. For example, the display format determination unit 103 performs this determination depending on whether the change amount of the size per 100 [ms] is less than 7 or not. In the case where the display apparatus is operating at 60 Hz and the focused region information can be acquired in 10 frame units, the threshold Th6 of the change amount of the size within a predetermined time ($10 \times (1/60) \times 1000$ [ms]) before acquiring the latest input image is 11.6 (see Expression 4).

$$Th6 = 10 \times (1/60) \times 1000 \times (7/100) \approx 11.6 \quad (4)$$

Description on the processing in steps S403 to S407, which are the same as the first embodiment, will be omitted.

In step S903, the display format determination unit 103 updates the rotation position and size of the focused region (a number of focused blocks in the second embodiment) which are held in the storage unit, to the current rotation position and the current size of the focused region, and ends the processing.

By the processing in FIG. 9, control is performed so that the zoom image is displayed alone (zoom mode) if the change of the position and size of the focused region is small, and the input image and the zoom image are both displayed (Multi mode) if this change is large.

Figure 10A:
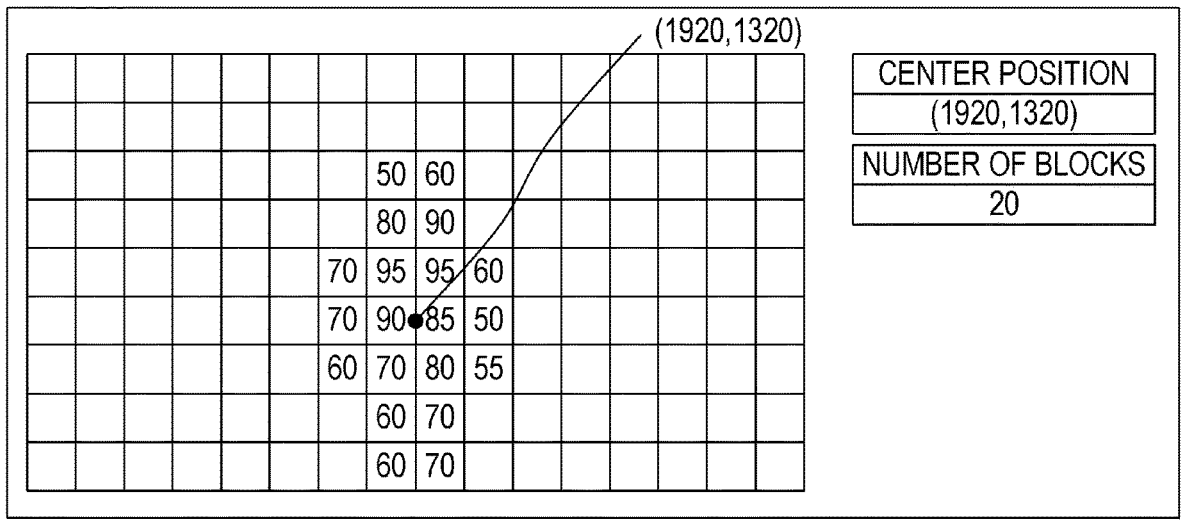
FIG. 10A to FIG. 10C are diagrams depicting an example of a focused region according to the second embodiment.
Figure 10B:
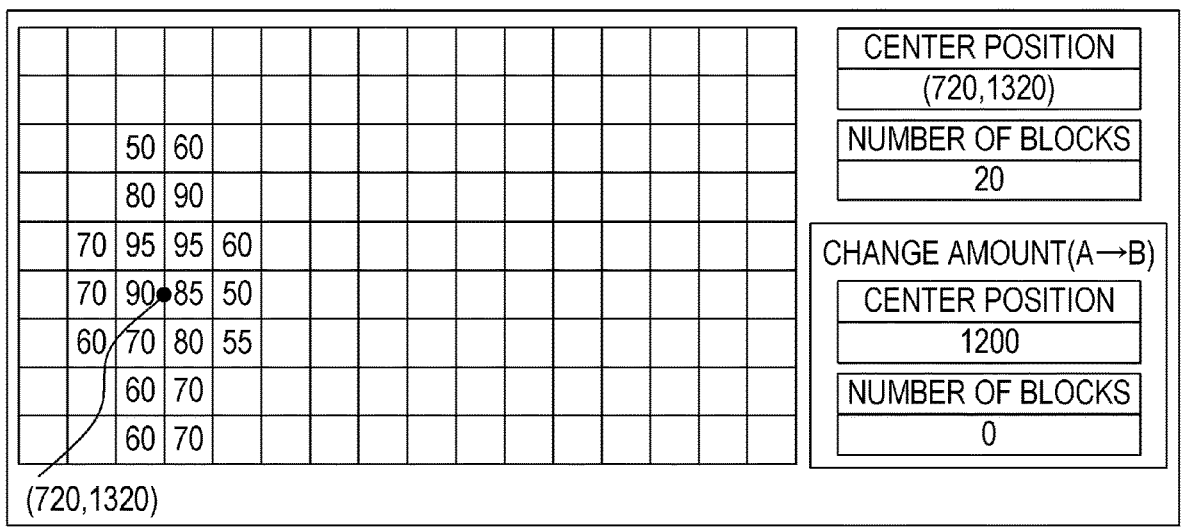
Figure 10C:
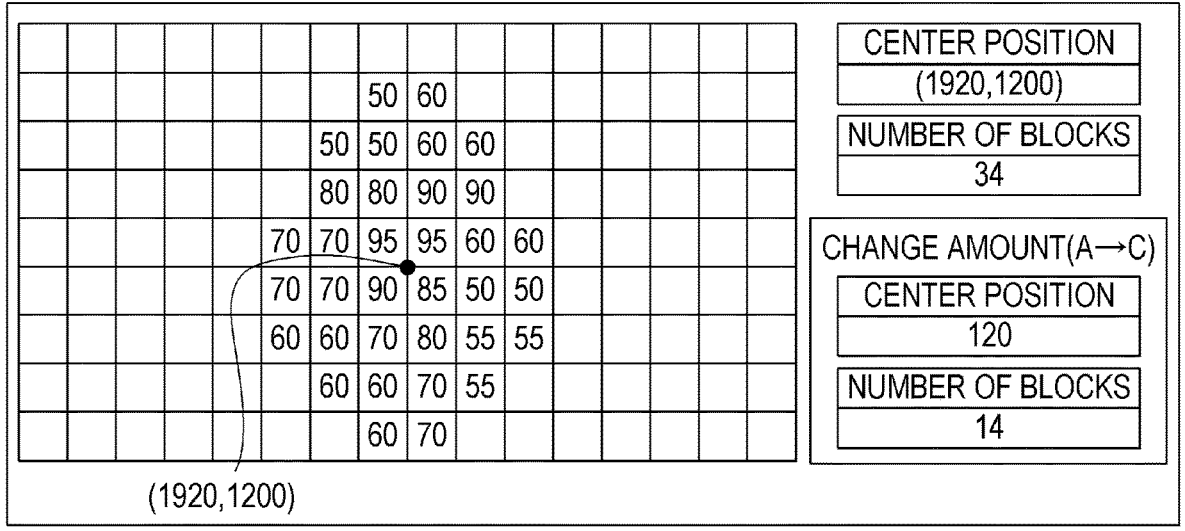

FIG. 10A to FIG. 10C are diagrams depicting the changes of the center position and the size of the focused region. FIG. 10A indicates an example of the focused region information, and the center position of the focused region and the size of the focused region based on the focused region information.

FIG. 10B indicates an example of the focused region information, the center position and a number of focused blocks after a predetermined time elapsed from the state in FIG. 10A. Comparing FIG. 10A and FIG. 10B, the change amount of the center position of the focused region is 1200 pixels. The change amount of the number of focused blocks is 0. In this case, the change amount of the center position is at least the predetermined threshold Th5 (167 pixels), hence the display apparatus 100 displays the image in the "Multi mode".

FIG. 10C indicates an example of the focused region information, the center position and a number of focused blocks after a predetermined time elapsed from the state in FIG. 10A. Comparing FIG. 10A and FIG. 10C, the change amount of the center position of the focused region is 120. The change amount of the number of focused blocks is 14. In this case, the change amount of the number of focused blocks is at least the predetermined threshold Th6 (11.6), hence the display apparatus 100 displays the image in the "Multi mode".

<Advantageous Effect of the Second Embodiment>

As described above, the display apparatus 100 according to the second embodiment determines the display mode with reference to the change amount of the position and size in a focused state. If the change amount of the position or the size is small, the display apparatus 100 displays the zoom image along on the entire screen. If the change amount of the position or the size is large, the display apparatus 100 displays the general image and the zoom image side-by-side. Thereby when the focus is adjusted, the user can check only the zoom image if the change of the position or the size of the focused region is small, and can check the entire input image as well while checking the zoom image if the change is large.

<Modification of the Second Embodiment>

In the second embodiment described above, the display mode is set to the "Zoom mode" or the "Multi mode" when the rotation position of the focus ring is changed, was described, but the rotation position of the focus ring need not be used for this setting. For example, the display apparatus may set the display mode to the "Zoom mode" or the "Multi mode" when the position (center position) or the size of the focused region changes, and set the display mode to the "General mode" when the position or the size does not change. Here the case where the position or the size of the focused region changes without change of the rotation position of the focus ring is a case where the object moved, for example.

The display apparatus may set the display mode using only one of: the position and the size of the focused region. In this case, when the position (or the size) of the focused region changes, the display apparatus sets the display mode to the "Zoom mode" or the "Multi mode" in accordance with the change amount thereof. When the position (or the size) of the focused region does not change, on the other hand, the display apparatus sets the display mode to the "General mode".

Third Embodiment

<Overview>

In the embodiments described above, only one zoom image is generated in the Multi mode, but in a third embodiment, an example of generating a plurality of zoom images for each of the plurality of focus targets will be described. In the following, a functional unit having a similar function to the first embodiment is denoted with the same number, for which description is omitted.

<General Configuration>

A display apparatus 100 according to the third embodiment has a configuration similar to the display apparatus 100 of the first embodiment, but the functions of the additional information acquisition unit 102, the display format determination unit 103 and the zoom image generation unit 104 are different.

The additional information acquisition unit 102 is a functional unit that acquires additional information added to the image signal. In the third embodiment, the additional information includes rotation position information of a focus ring, and focus target information. In the third embodiment, the additional information acquisition unit 102 outputs the acquired rotation position information and focus target information to the display format determination unit 103. Further, the additional information acquisition unit 102 outputs the acquired focus target information to the zoom image generation unit 104.

The focus target information is information that includes a "number of focus targets" and "region information (of each focus target)". The "number of focus targets" indicates a number of focused regions. In the third embodiment, the number of focus targets is a number of focused regions which are smaller than a predetermined size. In other words, if the entire input image is focused, the number of focus targets is 0. The "region information" is information to indicate the focused region information corresponding to each focus target. In the third embodiment, the region information is indicated by the coordinate values (x, y) of the start point of the focus target, and the width (w) and the height (h) of the focus target region.

The region information is not limited to the above information, but the coordinate values of the center position of the focus target may be used instead of the coordinate values of the start point of the focus target, for example. Further, in the third embodiment, an example when the focus target region is a rectangle will be described, but the shape of the target region is not especially limited, and the above mentioned focused region information may be used as the region information, just like the first embodiment. In this case, the display apparatus 100 determines that a plurality of focus targets exist if there are a plurality of focused regions which are not continuous.

Figures 11A, 11B:
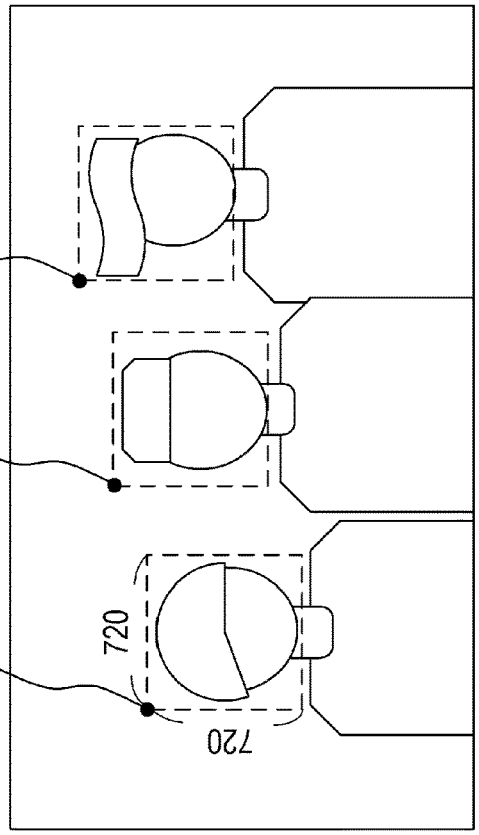
FIG. 11A and FIG. 11B are a table and a diagram to describe an example of a focus target according to a third embodiment.

FIG. 11A indicates the focus target information when a number of focus targets is 3. As indicated in FIG. 11A, the region information (x, y, w, h) of the focus target is determined for each of the three focus targets. FIG. 11B is an example of the focus target regions respectively corresponding to the three focus targets.

The display format determination unit 103 is a functional unit that determines the display mode (display format) based on the rotation position information and the focus target information. The display modes according to the third embodiment include: a "Plural Multi mode", in addition to the "General mode", the "Zoom mode" and the "Multi mode" of the first embodiment. The "Plurality Multi mode" is a mode to display the input image and a plurality of zoom images on the display unit 106. The processing to determine the display format will be described later with reference to FIG. 12. The display format determination unit 103 outputs the determined display format to the zoom image generation unit 104 and the combining unit 105.

The zoom image generation unit 104 is a functional unit that generates a zoom image based on the focus target information and the display format information. In the third embodiment, if a plurality of focus targets exist (if the display mode is the Plural Multi mode), the zoom image generation unit 104 generates a zoom image for each of at least two focused regions.

<Processing Content>

<<Display Format Determination Processing>>

Figure 12:
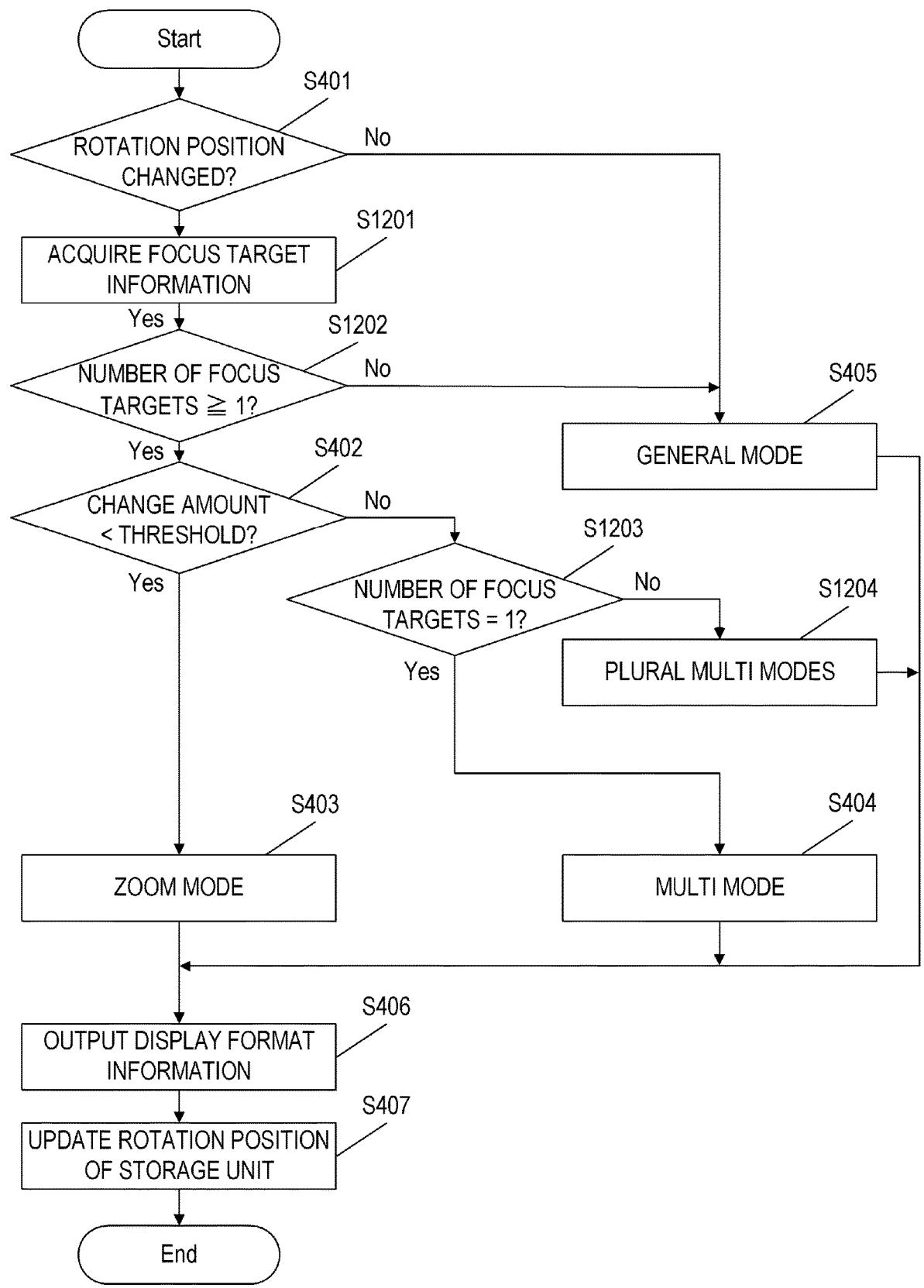
FIG. 12 is a flow chart depicting an example of display format determination processing according to the third embodiment.

FIG. 12 is a flow chart depicting processing (display format determination processing) to determine the display mode (display format) in the display format determination unit 103. Description on the processing in step S401, which is the same as the first embodiment, is omitted.

In step S1201, the display format determination unit 103 acquires the focus target information from the additional information acquisition unit 102.

In step S1202, the display format determination unit 103 determines whether a number of focus targets included in the focus target information is at least 1. Processing advances to step S402 if a number of focus targets is at least 1, or to step S405 if not (if a number of targets is 0). Here the case where the number of focus targets is 0 is a case of an image which has been adjusted so that the entire image is focused, such as a landscape (pan focus image), or a case of an image where no object is focused (blurred image), for example. Description on step S402, which is the same as the first embodiment, is omitted.

When it is determined that the change amount of the rotation position of the focus ring is not less than the predetermined threshold in step S402 (No in S402), the display format determination unit 103 determines whether the number of focus targets is 1 in step S1203. Processing advances to step S404 if the number of focus targets is 1, or to step S1204 if not. The case where the number of focus targets is not 1 is a case where a plurality of targets (e.g. faces of a plurality of individuals) are focused.

In step S1204, the display format determination unit 103 determines that the display format is the "Plural Multi mode". Description on the processing in steps S403 to S407, which are the same as the first embodiment, is omitted.

By the processing in FIG. 12, the input image and a plurality of zoom images are displayed side-by-side when a plurality of focus targets exist, whereby focus can be roughly adjusted for the plurality of focus targets.

<<Zoom Image Generation Processing>>

Figure 13:
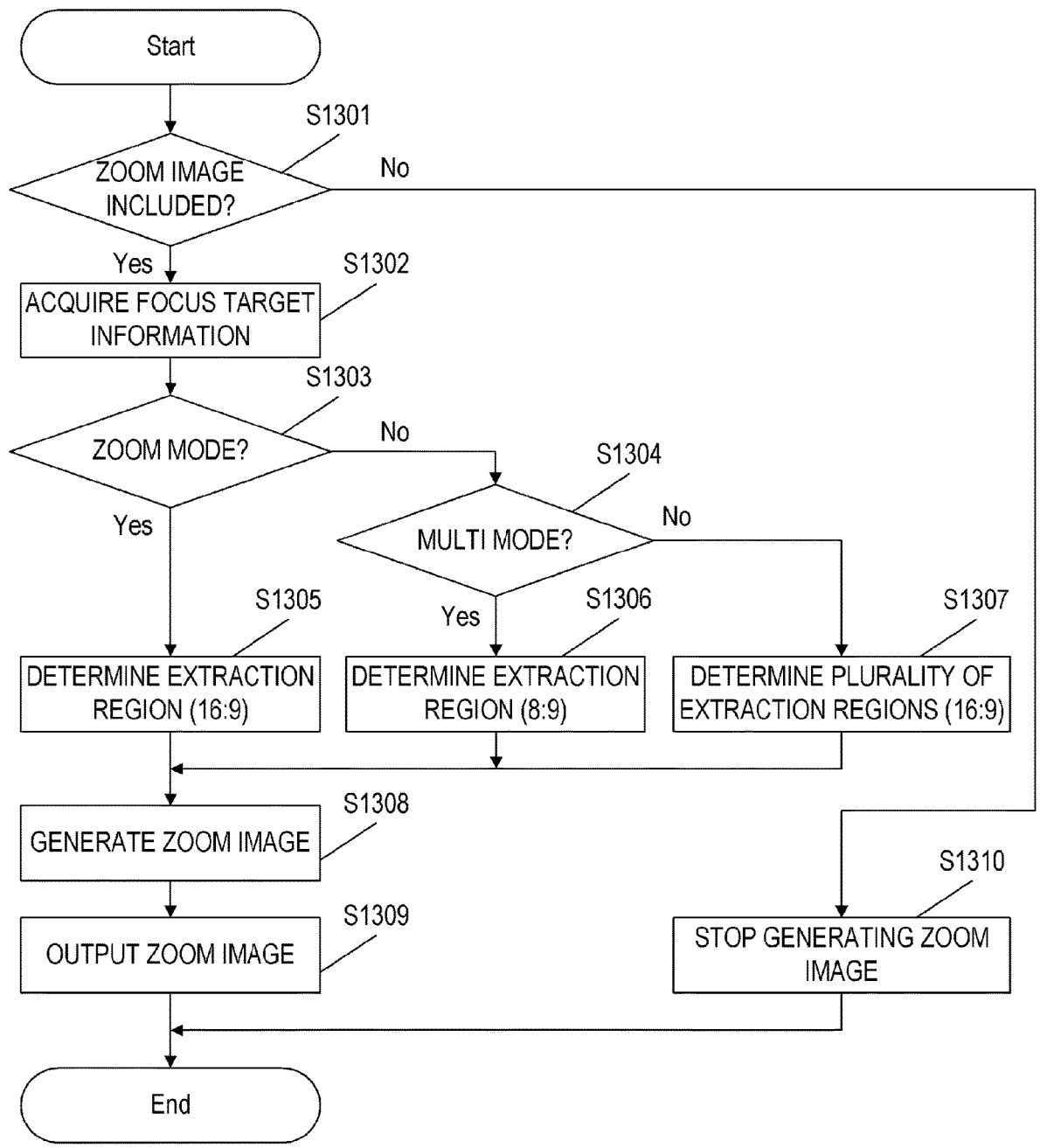
FIG. 13 is a flow chart depicting an example of zoom image generation processing according to the third embodiment.

FIG. 13 is a flow chart depicting processing to generate a zoom image (zoom image generation processing) in the zoom image generation unit 104. In the third embodiment, this processing is started when the zoom image generation unit 104 inputs the display format information from the display format determination unit 103.

In step S1301, the zoom image generation unit 104 determines whether the display mode is a mode to display an image including a zoom image. In the third embodiment, a mode to display an image including a zoom image is the "Zoom mode", the "Multi mode" or the "Plural Multi mode". A mode in which an image including a zoom image is not displayed is the "General mode". Processing advances to step S1302 if the display mode is a mode to display an image including a zoom image, or to step S1310 if not.

In step S1302, the zoom image generation unit 104 acquires the focus target information from the additional information acquisition unit 102.

In step S1303, the zoom image generation unit 104 determines whether the display mode is the "Zoom mode". Processing advances to step S1305 if the display mode is the "Zoom mode", or to step S1304 if not.

In step S1304, the zoom image generation unit 104 determines whether the display mode is the "Multi mode". Processing advances to step S1306 if the display mode is the "Multi mode", or to step S1307 if not.

In step S1305, the zoom image generation unit 104 determines a region to be extracted as a zoom image for the "Zoom mode" from the input image. In the third embodiment, it is assumed that the resolution of the input image and the screen resolution of the display unit 106 are 3840×2160, and the minimum magnification of the zoom is 1.5, just like the first embodiment described above. In the third embodiment, the zoom image is displayed on the entire screen having the display region of 3840×2160 pixels. Therefore the zoom image generation unit 104 determines a region which includes the focus target region, and of which aspect ratio is 16:9 and resolution is 2560×1440 or less, as the extraction region. If the extraction region has a resolution exceeding the zoomable resolution, the zoom image generation unit 104 may determine a 2560×1440 region, which includes the center of the focus target region, as the extraction region.

In step S1306, the zoom image generation unit 104 determines a region to be extracted as a zoom image for the "Multi mode" from the input image. In the third embodiment, it is assumed that the zoom image is displayed on the right half of the screen (1920×2160 display region), and the minimum magnification of the zoom is 1.5, just like the first embodiment described above. Therefore, the zoom image generation unit 104 determines a region which includes the focus target region, and of which aspect ratio is 8:9 and resolution is 1280×1440 or less, as the extraction region. If the extraction region has a resolution exceeding the zoomable resolution, the zoom image generation unit 104 may determines a 1280×1440 region, which includes the center of the focus target region, as the extraction region.

In step S1307, the zoom image generation unit 104 determines a plurality of regions to be extracted as zoom images for the "Plural Multi Mode" from the input image. In the third embodiment, it is assumed that the resolution of the region in which a plurality of zoom images are displayed of the resolution is the resolution (1920×1080) corresponding to one region determined by dividing the screen into 4 using vertical and horizontal lines. In the case where the minimum magnification of the zoom is 1.5, the zoom image generation unit 104 determines a region which includes the focus target region, and of which aspect ratio is 16:9 and resolution is 1280×720 or less, as the extraction region. If the extraction region has a resolution exceeding the zoomable resolution, the zoom image generation unit 104 may determine a 1280×720 region which includes the center of the focus target region, as the extraction region.

In the third embodiment, an example when the upper limit of a number of focus targets, for which zoom images are displayed, is 3, will be described. If there are 4 or more focus targets for which zoom images are displayed, a region having a highest degree of focus, out of the focus target regions, may be determined as the extraction region. Further, if there are 4 or more focus targets, the first 3 regions in the focus target region information may be determined as the extraction regions.

In step S1308, the zoom image generation unit 104 generates a zoom image by magnifying each image of one or more extraction regions so as to match the size of each display region.

In step S1309, the zoom image generation unit 104 outputs each zoom image generated in step S1308 to the combining unit 105.

In step S1310, the zoom image generation unit 104 ends the processing without generating a zoom image if the display mode is the "General mode" (No in S1301).

By the processing in FIG. 5, a control is executed in accordance with each display format which involves display of zoom images, so as to generate a zoom image in which the position of the focus target included in the focus target information is magnified with respect to the entire image.

<Display Example>

Figure 14A:
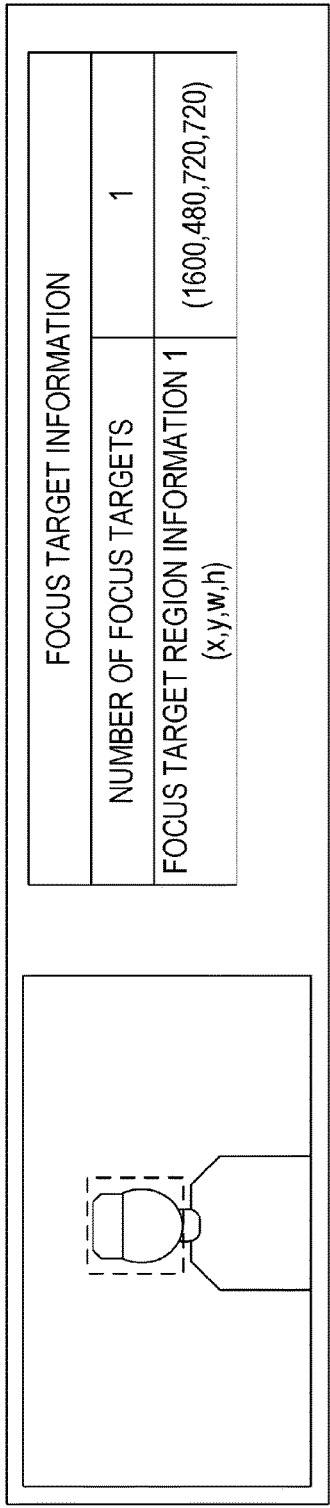
FIG. 14A to FIG. 14C are diagrams depicting an example of the image display according to the third embodiment.
Figure 14B:
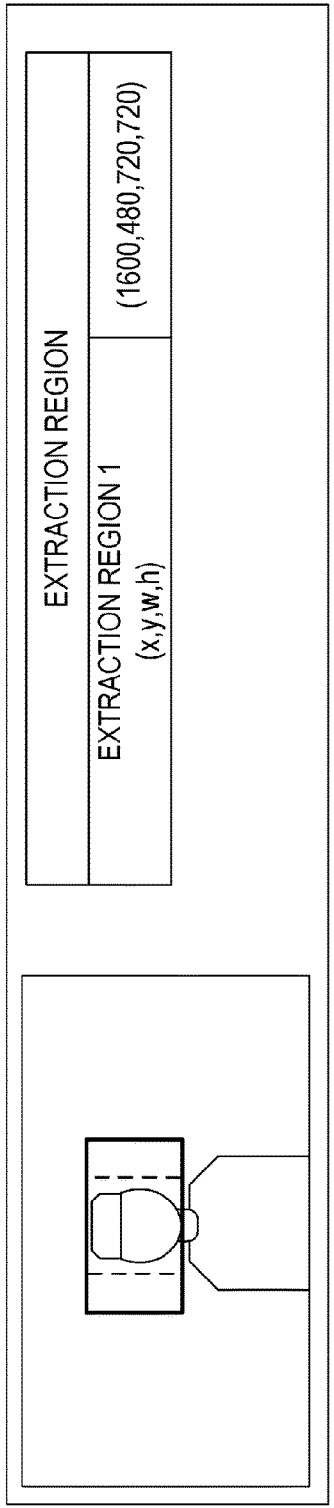
Figure 14C:
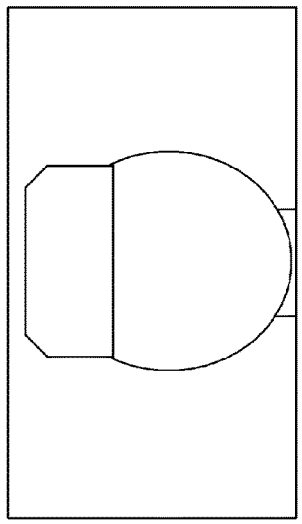

The extraction region and the display image in each display mode according to the third embodiment will be described. FIG. 14A to FIG. 14C are diagrams depicting a display example when a number of focus targets is 1 and the display mode is the "Zoom mode". FIG. 14A is a diagram depicting a focus target region in an input image. In this case, a number of focus targets is 1, and the focus target region information is as follows. FIG. 14B is a diagram depicting an extraction region in the input image. Here a following region which includes the focus target region and of which aspect ratio is 16:9 is determined as the extraction region for a zoom image. FIG. 14C is a diagram depicting an example of a display image combined by the combining unit 105. The region extracted in FIG. 14B is displayed in the display region of the entire screen in a state of being magnified.

Focus target region information 1: (1600, 480, 720, 720)
Extraction region 1: (1320, 480, 1280, 720)

Figure 15A:
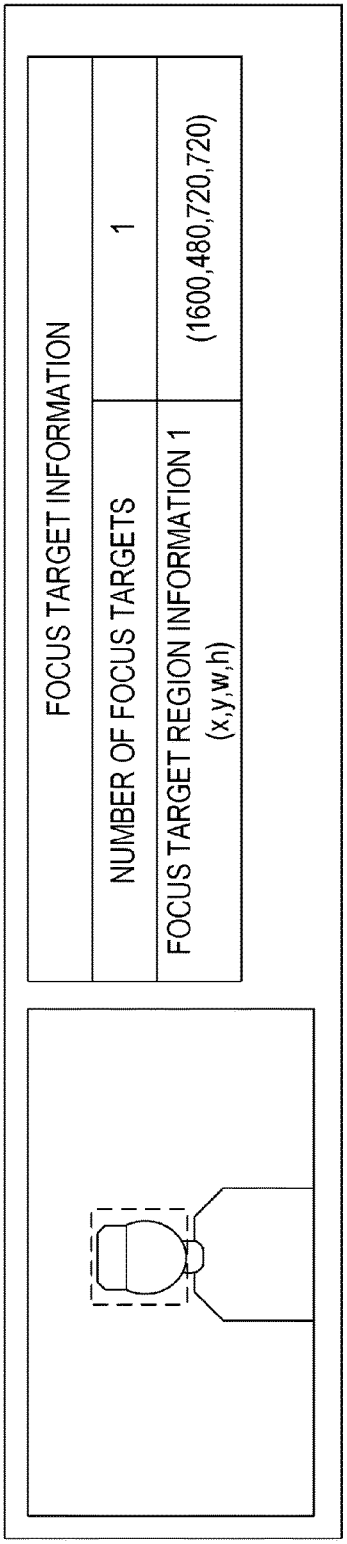
FIG. 15A to FIG. 15C are diagrams depicting an example of the image display according to the third embodiment.
Figure 15B:
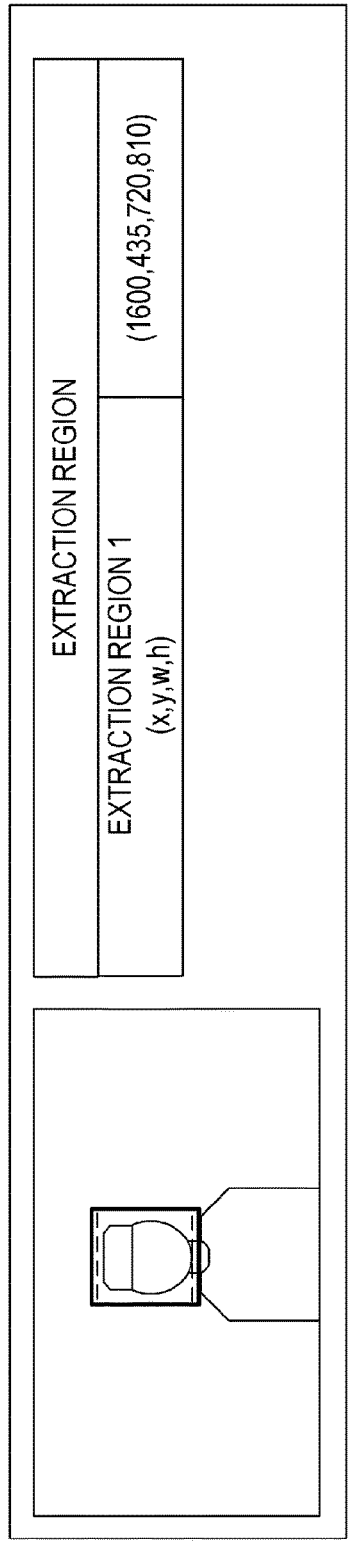
Figure 15C:
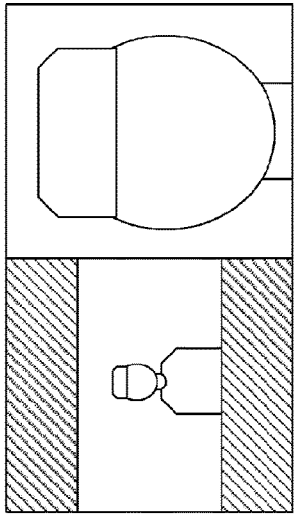

FIG. 15A to FIG. 15C are diagrams depicting a display example when a number of focus targets is 1 and the display mode is the "Multi mode". FIG. 15A is a diagram depicting a focus target region in the input image. In this case, a number of focus targets is 1, and the focus target region information is as follows. FIG. 15B is a diagram depicting an extraction region in the input image. Here a following region which includes the focus target region and of which aspect ratio is 8:9 is determined as the extraction region for a zoom image. FIG. 15C is a diagram depicting an example of a display image combined by the combining unit 105. The input image is displayed in the display region on the left side of the screen, and the region extracted in FIG. 15B is displayed in the display region on the right side of the screen in a state of being magnified.

Focus target region information 1: (1600, 480, 720, 720)
Extraction region 1: (1600, 435, 720, 810)

Figure 16A:
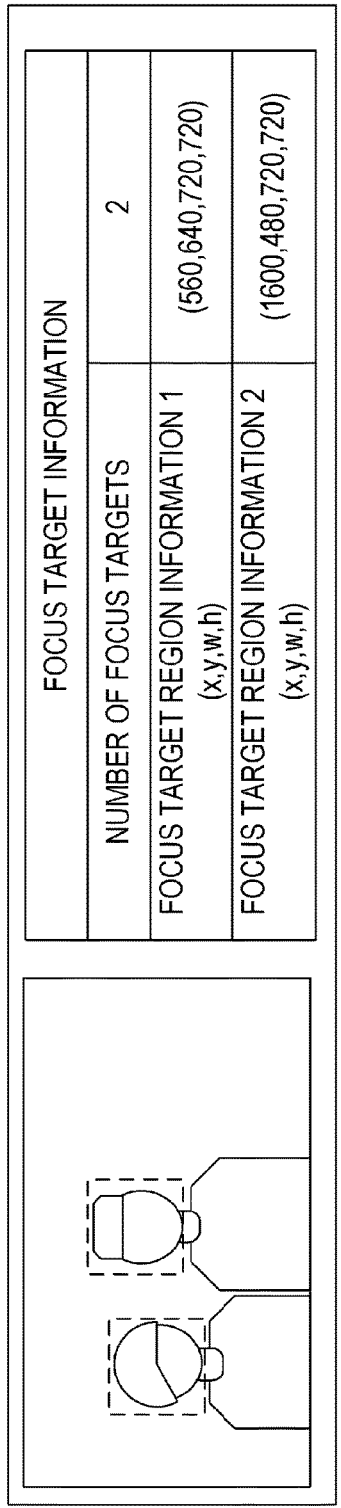
FIG. 16A to FIG. 16C are diagrams depicting an example of the image display according to the third embodiment.
Figure 16B:
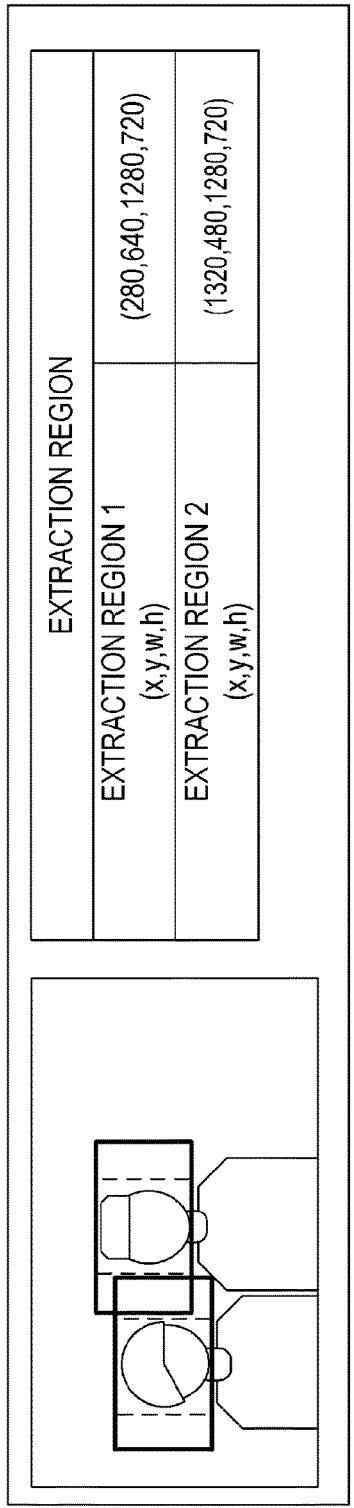
Figure 16C:
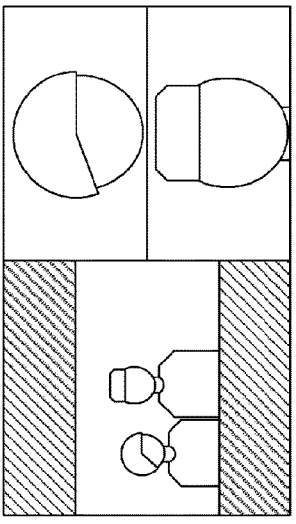

FIG. 16A to FIG. 16C are diagrams depicting a display example when a number of focus targets is 2 and the display mode is the "Plural Multi mode". FIG. 16A is a diagram depicting a focus target region in the input image. In this case, a number of focus targets is 2, and the focus target region information 1 and 2 are as follows. FIG. 16B is a diagram depicting extraction regions in the input image. Here a following region which includes each focus target region and of which aspect ratio is 16:9 is determined as the extraction region for each zoom image. FIG. 16C is a diagram depicting an example of a display image combined by the combining unit 105. The input image is displayed in the display region at the center on the left side of the screen, and two extraction regions indicated in FIG. 16B are displayed in each display region on the upper right and lower right of the screen in a state of being magnified.

Focus target region information 1: (560, 640, 720, 720)
Focus target region information 2: (1600, 480, 720, 720)
Extraction region 1: 280, 640, 1280, 720)
Extraction region 2: (1320, 480, 1280, 720)

Figure 17A:
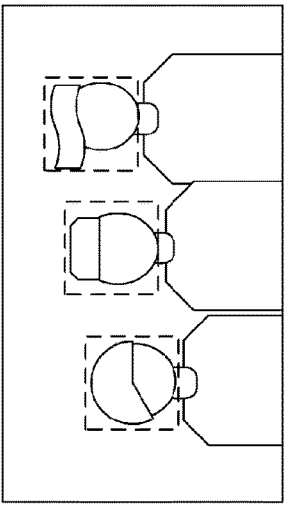
FIG. 17A to FIG. 17C are diagrams depicting an example of the image display according to the third embodiment.
Figure 17B:
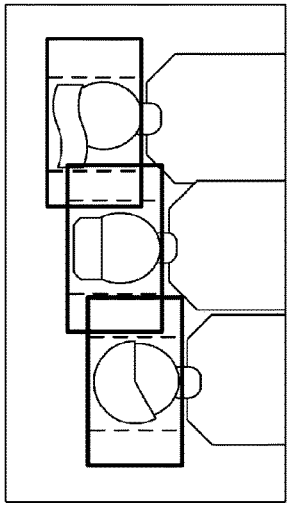
Figure 17C:
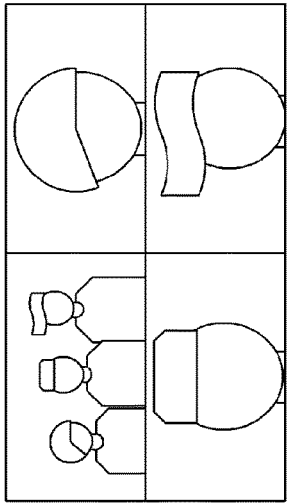

FIG. 17A to FIG. 17C are diagrams depicting a display example when a number of focus targets is 3 and the display mode is the "Plural Multi mode". FIG. 17A is a diagram depicting a focus target region in the input image. In this case, a number of focus targets is 3, and the focus target region information 1 to 3 are as follows. FIG. 17B is a diagram depicting extraction regions in the input image. Here a following region which includes each focus target region and of which aspect ratio is 16:9 is determined as the extraction region for each zoom image. FIG. 17C is a diagram depicting an example of a display image combined by the combining unit 105. The input image is displayed in the display region on the upper left of the screen, and the three extraction regions indicated in FIG. 17B are displayed in each display region on the lower left, upper right and lower right of the screen in a state of being magnified.

Focus target region information 1: (560, 640, 720, 720)
Focus target region information 2: (1600, 480, 720, 720)
Focus target region information 3: (2480, 320, 720, 720)
Extraction region 1: (280, 640, 1280, 720)
Extraction region 2: (1320, 480, 1280, 720)
Extraction 3: (2200, 320, 1280, 720)

<Advantageous Effect of the Third Embodiment>

As mentioned above, the display apparatus 100 according to the third embodiment determines the display mode based on the change amount of the rotation position of the focus ring and a number of focus targets. If there are 2 or more focus targets, the input image and the plurality of zoom images corresponding to each focus target are displayed side-by-side. Thereby even if there are a plurality of focus targets, the user can check the entire input image while checking each of the zoom images of the focus targets to perform fine adjustment of the focus.

(Modifications)

In the embodiments described above, the input image and the zoom images are arranged horizontally or vertically in the "Multi mode" or "Plural Multi mode", but the arrangement of each image is not especially limited. For example, the zoom image may be displayed on the entire screen so that a reduced input image is displayed superimposed on a part of the region of the zoom image. In this case, it is preferable that the input image is superimposed on a position which does not overlap with the focused region of the zoom image. The input image may be displayed on the entire screen, so that the zoom image may be displayed on a part of the region of the input image.

In the above examples, the extraction region has a fixed aspect ratio and a variable size, but the maximum size of the extraction region may be set in advance.

In the embodiments described above, each image is a rectangle, but the size and shape of each image are not especially limited. For example, each of the input image and the zoom image may be displayed as a circle, an ellipse or the like.

In the embodiments described above, an operation example in the manual mode was described, but the above mentioned processing may be performed in the auto mode (auto focus: AF).

In the embodiments described above, the display mode is determined based on the rotation position or a position or a size of the focused region, but the display mode may be determined based on a change amount of a focus position, or a change amount of the input image (e.g. change amount of the histogram) per unit time. Further, the display mode may be determined depending on the target (e.g. display apparatus, imaging apparatus) for which the focus position is controlled. Furthermore, the region to be magnified (extraction region) may be determined based on the change amount of the focus position or the change amount of the input image per unit time.

In the embodiments described above, the display apparatus alone performs the processing, but the processing may be performed by a display control apparatus that is separated from the display apparatus. In this case, the above mentioned processing may be executed by an imaging apparatus which includes: an optical system, an imaging unit that captures an object image formed by the optical system; and this display control apparatus.

(Other)

The present invention has been described using or based on some embodiments. New embodiments that are implemented by any combination of the above embodiments are also included in the embodiments of this invention. The effects of the new embodiments implemented by the combination of the above embodiments also include the effects of these original embodiments. The technical scope of the present invention is not limited to the scope of the embodiments, but can be modified and changed in various ways within the scope of the essence of the invention.

According to this disclosure, a technique to switch the display appropriately in accordance with the adjustment of the focus can be provided.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-227505, filed on Dec. 4, 2018, which is hereby incorporated by reference herein in its entirety.

What is claimed is:

1. A display control apparatus, comprising:
at least one processor and/or at least one circuit to perform the operations of the following units:
an input unit configured to acquire an input image, which is an image captured by a camera;
a generation unit configured to generate a zoom image, which is an image generated by magnifying a region of the input image;
an acquisition unit configured to acquire focus information of the camera; and
a determination unit configured to determine a display image on a display unit on the basis of a change amount of the focus information,
wherein the determination unit is further configured to determine that:
(1) the display image is the input image in a case where the change amount is 0;
(2) the display image is the zoom image in a case where the change amount is smaller than a predetermined value; and
(3) the display image is both the input image and the zoom image in a case where the change amount is greater than the predetermined value.

2. The display control apparatus according to claim 1,
wherein the generation unit is further configured to generate a plurality of zoom images, and
wherein, in a case where the generation unit generates the plurality of zoom images and the change amount is greater than the predetermined value, the determination unit is further configured to determine that the display image is an image in which the input image and the plurality of zoom images are arranged side by side.

3. The display control apparatus according to claim 1, wherein the focus information is information on focus in a case where the camera in a manual focus mode.

4. The display control apparatus according to claim 1, wherein the focus information includes information on a focal distance of an optical system.

5. The display control apparatus according to claim 1, wherein the focus information includes information on an aperture of an optical system.

6. The display control apparatus according to claim 1, wherein the focus information includes information on a position of a focused region in the input image.

7. The display control apparatus according to claim 1, wherein the focus information includes information on a size of a focused region in the input image.

8. The display control apparatus according to claim 1, wherein the generation unit is further configured to generate the zoom image so as to include a focused region of the input image.

9. The display control apparatus according to claim 8, wherein, in a case where a plurality of focused regions exist in the input image, the generation unit is further configured to generate a zoom image for each of the plurality of focused regions.

10. A camera that captures an object image, comprising:
an optical system that forms the object image; and
the display control apparatus according to claim 1.

11. A control method for a display apparatus, the control method comprising:
acquiring an input image, which is an image captured by a camera;
generating a zoom image, which is an image generated by magnifying a region of the input image;
acquiring focus information of the camera; and
determining a display image on a display unit on the basis of a change amount of the focus information and further determining that
(1) the display image is the input image in a case where the change amount is 0;
(2) the display image is the zoom image in a case where the change amount is smaller than a predetermined value; and
(3) the display image is both the input image and the zoom image in a case where the change amount is greater than the predetermined value.

12. A non-transitory computer readable medium that stores a program, wherein the program causes a computer to execute a control method for a display apparatus, the control method comprising:
acquiring an input image, which is an image captured by a camera;
generating a zoom image, which is an image generated by magnifying a region of the input image;
acquiring focus information of the camera; and
determining a display image on a display unit on the basis of a change amount of the focus information and further determining that
(1) the display image is the input image in a case where the change amount is 0;
(2) the display image is the zoom image in a case where the change amount is smaller than a predetermined value; and
(3) the display image is both the input image and the zoom image in a case where the change amount is greater than the predetermined value.

* * * * *